US012659237B2

(12) United States Patent
Liu et al.

(10) Patent No.: US 12,659,237 B2
(45) Date of Patent: Jun. 16, 2026

(54) METHOD AND APPARATUS FOR SUBSCRIBING TO ANALYTICS OF MODEL TRANSFER STATUS IN NETWORK, AND READABLE STORAGE MEDIUM

(71) Applicant: DATANG MOBILE COMMUNICATIONS EQUIPMENT CO., LTD., Beijing (CN)

(72) Inventors: Yingying Liu, Beijing (CN); Wenhui Wang, Beijing (CN); Xiaoyan Duan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 301 days.

(21) Appl. No.: 18/701,933

(22) PCT Filed: Oct. 24, 2022

(86) PCT No.: PCT/CN2022/127034
§ 371 (c)(1),
(2) Date: Apr. 17, 2024

(87) PCT Pub. No.: WO2023/093416
PCT Pub. Date: Jun. 1, 2023

(65) Prior Publication Data
US 2024/0414063 A1 Dec. 12, 2024

(30) Foreign Application Priority Data
Nov. 24, 2021 (CN) .......................... 202111407051.2

(51) Int. Cl.
*H04L 41/14* (2022.01)
*H04L 41/16* (2022.01)
(Continued)

(52) U.S. Cl.
CPC .............. *H04L 41/14* (2013.01); *H04L 41/16* (2013.01); *H04W 24/02* (2013.01); *H04W 28/0268* (2013.01)

(58) Field of Classification Search
None
See application file for complete search history.

(56) References Cited

U.S. PATENT DOCUMENTS

2005/0286470 A1 12/2005 Asthana et al.
2018/0131579 A1* 5/2018 Jacobs .................. H04L 41/022
(Continued)

FOREIGN PATENT DOCUMENTS

CN 110300006 A 10/2019
CN 110677299 A 1/2020
(Continued)

OTHER PUBLICATIONS

Office Action of Corresponding Cn Patent Application No. 202111407051.2 Dated Jul. 17, 2025.
(Continued)

*Primary Examiner* — Robert M Morlan
(74) *Attorney, Agent, or Firm* — Kilpatrick Townsend & Stockton LLP

(57) ABSTRACT

The present disclosure provides a method and an apparatus for subscribing to an analytics of model transfer status in a network, and a readable storage medium, the method includes: an application function AF sending a first message to a network data analytic function NWDAF directly or through a network exposure function NEF; the AF receiving, directly or through the NEF, analytics information of AI/ML model transfer status sent by the NWDAF, the analytics information being determined by the NWDAF according to received data of the AI/ML model transfer status sent by other network function(s) 5GC NF(s); the analytics infor-
(Continued)

mation being used to adjust a network policy parameter and/or information of an application layer model. In the present disclosure, a network can effectively adjust a network transmission policy based on the AI/ML model transfer status and a third party can adjust information of an application layer.

20 Claims, 8 Drawing Sheets

(51) Int. Cl.
    *H04W 24/02*        (2009.01)
    *H04W 28/02*        (2009.01)

(56) References Cited

U.S. PATENT DOCUMENTS

| | | | |
|---|---|---|---|
| 2021/0014141 A1 | 1/2021 | Patil et al. | |
| 2021/0021494 A1 | 1/2021 | Yao et al. | |
| 2021/0044488 A1* | 2/2021 | Wu | H04L 67/30 |
| 2021/0099367 A1 | 4/2021 | Han et al. | |
| 2021/0337555 A1 | 10/2021 | Fan et al. | |
| 2024/0373291 A1* | 11/2024 | So | H04W 28/0925 |

FOREIGN PATENT DOCUMENTS

| | | |
|---|---|---|
| CN | 111770490 A | 10/2020 |
| CN | 112423382 A | 2/2021 |
| CN | 113676846 A | 11/2021 |
| IN | 202047051318 A | 12/2020 |
| JP | 2022549782 A | 11/2022 |
| JP | 2023515194 A | 4/2023 |
| WO | 2021032495 A1 | 2/2021 |
| WO | 2021141291 A1 | 7/2021 |
| WO | 2021170238 A1 | 9/2021 |

OTHER PUBLICATIONS

Intel Corporation. AI/ML based network energy saving. 3GPP TSG-RAN WG3 Meeting #113-e, R3-213469, Electronic meeting, Aug. 16-26, 2021.

State Intellectual Property Office of the People's Republic of China, International Search Report and written opinion Issued in Application No. PCT/CN2022/127034, Jan. 18, 2023, 12 pages.

3GPP TR 22.874 V1.0.0,3rd Generation Partnership Project;Technical Specification Group Services and System Aspects;Study on traffic characteristics and performance requirements for AI/ML model transfer in 5GS, (Release 18), Mar. 2021, total 103 pages.

Supplementary European Search Report of Corresponding European Patent Application No. 22897499.4 Dated Feb. 27, 2025.

"3rd Generation Partnership Project; Technical Specification Group Services and System Aspects; Study on enablers for network automation for the 5G System (5GS); Phase 2 (Release 17)", 3GPP Draft; SP-200971.ZIP 23700-91_DIFF_V100-V200, 3rd Generation Partnership Project (3GPP), Mobile Competence Centre; 650, Route Des Lucioles ; F-06921 Sophia-Antipolis Cedex; France, Nov. 30, 2020 (Nov. 30, 2020), XP051963813.

Office Action of Corresponding JP Patent Application No. 2024-529997 Dated Mar. 7, 2025.

OPPO, 5GS Assisted AIML Services and Transmissions (FS_5 GAIML), 3GPP TSG SA WG2 #145E S2-2103759, Internet<URL:https://www.3gpp.org/ftp/tsg_sa/WG2_Arch/TSGS2_145E_Electronic_2021-05/Docs/S2-2103759.zip>, May 10, 2021.

The second office action and search report issued in Chinese corresponding application 202111407051.2, mailed on Dec. 25, 2025.

* cited by examiner

| 5GC | | | | | OCS |
|---|---|---|---|---|---|

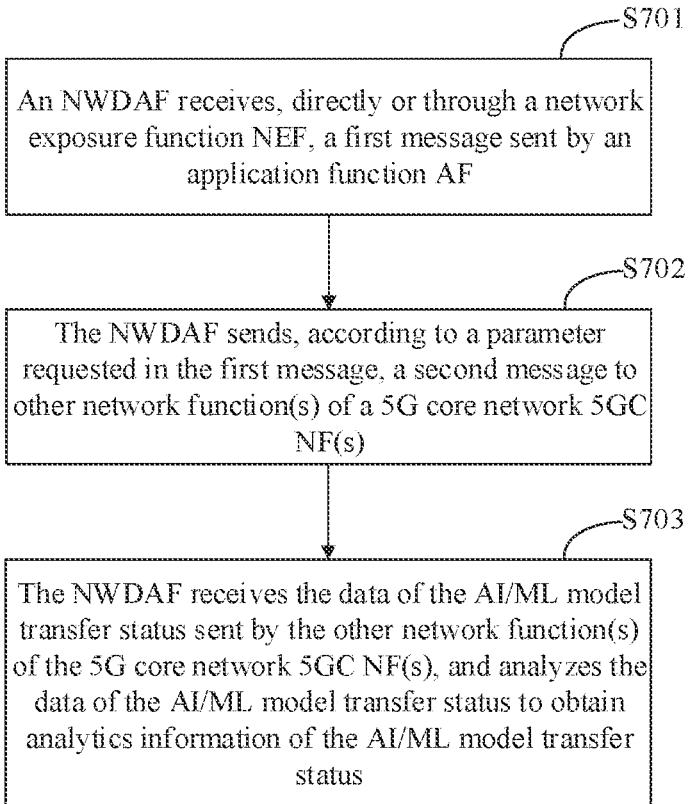

S701

An NWDAF receives, directly or through a network exposure function NEF, a first message sent by an application function AF

S702

The NWDAF sends, according to a parameter requested in the first message, a second message to other network function(s) of a 5G core network 5GC NF(s)

S703

The NWDAF receives the data of the AI/ML model transfer status sent by the other network function(s) of the 5G core network 5GC NF(s), and analyzes the data of the AI/ML model transfer status to obtain analytics information of the AI/ML model transfer status

FIG. 7

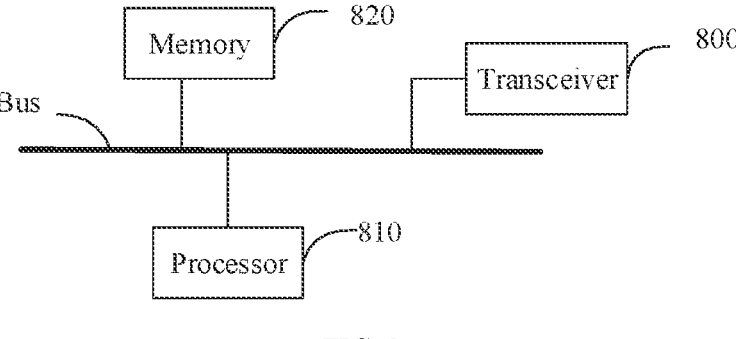

Memory    820

Transceiver    800

Bus

Processor    810

Figures 9, 10:
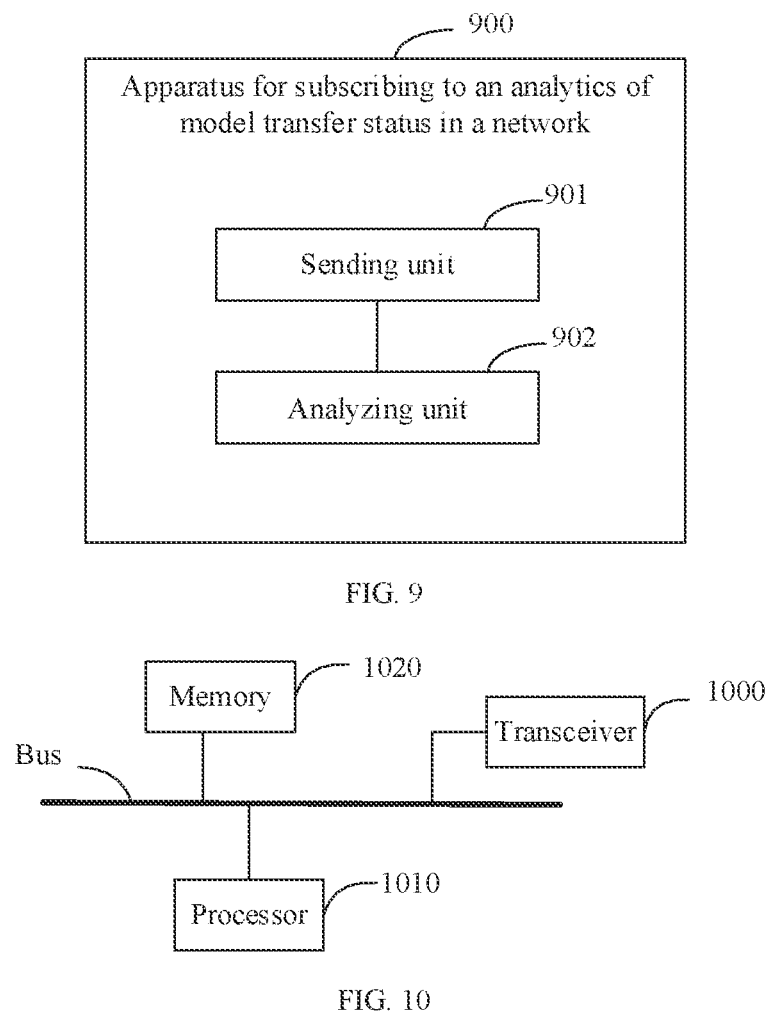

Apparatus for subscribing to an analytics of
model transfer status in a network

901

Sending unit

902

Analyzing unit

Memory

Bus

Transceiver

1000

Processor

METHOD AND APPARATUS FOR SUBSCRIBING TO ANALYTICS OF MODEL TRANSFER STATUS IN NETWORK, AND READABLE STORAGE MEDIUM

CROSS-REFERENCE TO RELATED APPLICATIONS

The present disclosure is a national stage of International Application No. PCT/CN2022/127034, filed on Oct. 24, 2022, which claims priority to Chinese patent application No. 202111407051.2, filed on Nov. 24, 2021. Both of the aforementioned applications are hereby incorporated by reference in their entireties.

FIELD

The present disclosure relates to the field of communication technologies and, in particular, to a method and an apparatus for subscribing to an analytics of model transfer status in a network, and a readable storage medium.

BACKGROUND

In recent years, due to technological breakthroughs in artificial intelligence, applications of artificial intelligence have become more and more extensive. For a mobile terminal, due to its strict limitations on energy consumption, computing, and memory costs, it is unable to run heavyweight artificial intelligence (AI)/machine learning (MI) model (hereinafter referred to as AI/ML model) on a terminal. Therefore, a current method is to transmit the inference of many AI/ML models from the mobile terminal to a cloud or other terminals, that is, it is necessary to transfer the AI/ML model to the cloud or other terminals.

In addition, a transmission requirement for the AI/ML model also becomes higher and higher in view of considerations on privacy protection of transmission data and alleviation of a pressure of network transmission data. 5G system is configured as a channel to transfer the AI/ML model, in order to improve an intelligence capability of a 5G network and meet the requirement for transferring the AI/ML model in the 5G system in TS 22.261 agreed in SA1 #93e, the 5G system needs to support exposure of monitoring and status information about an AI-ML session to a third party.

However, in prior art, it is impossible to effectively analyze AI/ML model transfer status, thus making it impossible for the network to effectively adjust a network transmission policy based on the AI/ML model transfer status, and the third party cannot obtain an analytics of the AI/ML model transfer status to adjust information of an application layer.

SUMMARY

The present disclosure provides a method and an apparatus for subscribing to an analytics of model transfer status in a network, and a readable storage medium, which solves the problem that AI/ML model transfer status cannot be effectively analyzed, and a network transmission policy cannot be effectively adjusted by a network based on the AI/ML model transfer status and an analytics of the AI/ML model transfer status cannot be obtained by a third party to adjust information of an application layer.

In one embodiment of the present disclosure provides a method for subscribing to an analytics of model transfer status in a network, the method is applied to an application function AF, and the method includes:

sending a first message to a network data analytic function NWDAF directly or through a network exposure function NEF, where the first message is configured to request a subscription of analytics information of artificial intelligence/machine learning AI/ML model transfer status in the network;

receiving, directly or through the NEF, the analytics information of the AI/ML model transfer status sent by the NWDAF, where the analytics information is determined by the NWDAF according to received data of the AI/ML model transfer status sent by other network function(s) of a 5G core network 5GC NF(s);

where the analytics information is configured to adjust a network policy parameter and/or information of an application layer model.

In an embodiment, the data of the AI/ML model transfer status is obtained by the NWDAF by sending a second message to the 5GC NF(s) according to a parameter requested in the received first message, and the second message is configured to collect data for analyzing the AI/ML model transfer status in the network.

In an embodiment, the parameter requested in the first message includes at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

In an embodiment of the present disclosure, by sending a request of subscribing to analytics information of AI/ML model transfer status in a network to an NWDAF, receiving the analytics information sent by the NWDAF determined according to collected data from 5GC NF(s), and adjusting a network policy parameter and/or information of an application layer model according to the analytics information, an effective analytics of the AI/ML model transfer status is conducted, to enable a network to effectively adjust a network transmission policy based on the AI/ML model transfer status and enabling a third party to obtain the analytics of the AI/ML model transfer status for adjusting information of an application layer.

In an embodiment, after receiving the analytics information, the method further includes:

sending, according to the analytics information, a first request to a policy control function PCF directly or through the NEF;

where the first request is configured to request an update of a network policy parameter for the AI/ML model transfer and the network policy parameter is configured to optimize the AI/ML model transfer status.

In an embodiment, the sending, according to the analytics information, the first request to the policy control function PCF directly or through the NEF includes:

determining, according to at least one of a bit rate in an uplink direction for transferring an AI/ML model and a bit rate in a downlink direction for transferring the AI/ML model, a packet delay in an uplink direction for an AI/ML model and a packet delay in a downlink direction for the AI/ML model, a number of abnormal releases of a quality of service flow during a time period of an AI/ML model transfer or a number of times for which a reporting threshold for abnormal releases of a quality of service flow during a time period of an AI/ML model transfer in the analytics information is reached, a new quality of service parameter for transferring the AI/ML model, where the new quality of service parameter includes at least one of the following: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

determining, according to the identifier of the application using the AI/ML model, the area information using the AI/ML model, IP address information of an application service using the AI/ML model, the network slice for the PDU session for the quality of service flow on which the AI/ML model is transferred and the name of the data network for the PDU session for the quality of service flow on which the AI/ML model is transferred in the analytics information, area information and address information of UE(s) and a respective AF transferring the AI/ML model; or, if the AI/ML model performs a federated learning, determining, according to the identifier indicating the federated learning group for analytics, the identifier of the UE or the identifier(s) of the UE(s) participating in the federated learning, the indication of the identifier of the respective application providing the AI/ML model or participating in the federated learning in the analytics information, area information and address information of UE(s) and a respective AF transferring the AI/ML model;

determining, according to the area information and the address information of the UE(s) and the respective AF transferring the AI/ML model, a data network access identifier DNAI and area information and address information of UE(s) and a respective AF corresponding to the DNAI, where the area information and the address information of the UE(s) and the respective AF corresponding to the DNAI are used to provide a path for optimization of the AI/ML model transfer status;

sending the new quality of service parameter, the DNAI, and the area information and the address information of the UE(s) and the respective AF corresponding to the DNAI to the PCF as the parameter requested in the first request directly or through the NEF.

In an embodiment, the determining, according to the area information and the address information of the UE(s) and the respective AF transferring the AI/ML model, the data network access identifier DNAI and the area information and the address information of the UE(s) and the respective AF corresponding to the DNAI includes:

determining, according to the area information and the address information of the UE(s) and the respective AF transferring the AI/ML model, whether a current routing path is not good;

if the current routing path is not good, determining, according to the address information of the UE(s) and the respective AF transferring the AI/ML model and the area information of the UE(s), destination addresses of both transferring parties in the AI/ML model;

determining, according to the destination addresses, a nearest path;

determining, according to the nearest path, the DNAI and the area information and the address information of the UE(s) and the respective AF corresponding to the DNAI.

In an embodiment, the first request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter, and indicate the PCF to feedback a first update result adjusted directly or through the NEF; where the first update result is determined by the PCF according to a result of the adjustment of the PCC rule based on the new quality of service parameter;

correspondingly, the method further includes:

receiving, directly or through the NEF, the first update result sent by the PCF, where the first update result includes the first request being accepted or the first request being rejected.

In an embodiment, the first request is specifically used to:

request the PCF to determine whether a session management function SMF network element needs to update a session management policy, if it is determined that the SMF needs to update the session management policy, then determine that the PCF sends a second request to the SMF, where a parameter requested in the second request includes at least one of the following: a DNAI, a traffic steering policy identifier, traffic route information, and the second request is configured by the SMF to determine a selected user plane function UPF according to a new session management policy and provide a corresponding DNAI, a corresponding traffic steering policy identifier, and corresponding traffic route information;

correspondingly, the method further includes:

receiving, directly or through the NEF, a second update result sent by the PCF, where the second update result is determined by the PCF according to whether a UPF path is updated on account of the new session management policy sent by the SMF;

where the second update result includes the second request being accepted or rejected.

In an embodiment of the present disclosure, a new quality of service parameter is determined according to analytics information, the new quality of service parameter is sent to a PCF, and the PCF adjusts a PCC rule correspondingly in accordance with the new quality of service parameter or updates an SM policy and provides a DNAI and area information and address information of UE(s) and respective AF corresponding to the DNAI through an SMF, by receiving a notification sent by the PCF representing whether a first request is accepted or rejected, thus achieving the request of adjustment on a network policy based on an analytics result from the NWDAF, to optimize AI/ML model transfer status.

In an embodiment, after receiving the analytics information, the method further includes:

adjusting, according to the analytics information, the information of the application layer model, where the information of the application layer model includes at least one of: model compression, a model size, a model transmission time period, model encoding and decoding; the information of the application layer model is configured to update a quality of service parameter;

determining, according to the adjusted information of the application layer model, the new quality of service parameter, where the new quality of service parameter includes: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

sending a third request to a policy control function PCF directly or through the NEF;

where a parameter requested in the third request includes the new quality of service parameter, and the third request is configured to request an update of a quality of service parameter.

In an embodiment, the third request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter;

correspondingly, the method further includes:

receiving, directly or through the NEF, a third update result sent by the PCF, where the third update result is determined by the PCF based on a result of the adjustment of the PCC rule, and the third update result includes the third request being accepted or the third request being rejected.

In an embodiment, after adjusting the information of the application layer model, the method further includes:

sending model compression, a model size and model encoding and decoding in the adjusted information of the application layer model directly to the PCF, where the adjusted information of the application layer model is configured to support the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow in a PCC rule;

correspondingly, the method further includes:

receiving a fourth update result sent by the PCF, where the fourth update result is determined by the PCF according to a result of the adjustment of the PCC rule based on the adjusted information of the application layer model, and the fourth update result includes the third request being accepted or the third request being rejected.

In an embodiment, after adjusting the information of the application layer model, the method further includes:

sending the model transmission time period in the adjusted information of the application layer model directly to the PCF, where the model transmission time period in the adjusted information of the application layer model is configured to support the PCF to adjust a gate status parameter in a PCC rule, and the gate status parameter is configured to support the SMF to update a session management policy according to a transmission start time and a transmission stop time in a gate status;

correspondingly, the method further includes:

receiving a fifth update result sent by the PCF, where the fifth update result is determined by the PCF by receiving a result of a new session management policy sent by the SMF, and the fifth update result includes the third request being accepted or the third request being rejected.

In an embodiment of the present disclosure, information of an application layer model is adjusted according to analytics information, anew quality of service parameter is determined in accordance with the adjusted information of the application layer model, and the new quality of service parameter is sent to a PCF to enable the PCF to adjust a PCC rule correspondingly in accordance with the new quality of service parameter; or, the adjusted information of the application layer model is sent to the PCF directly to enable the PCF to adjust the above quality of service parameter in the PCC rule in accordance with a model compression, a model size, model encoding and decoding, or, to enable the PCF to adjust a gate status parameter in the PCC rule in accordance with a model transmission time period to make an SMF update a session management policy according to a transmission start time and a transmission stop time in the gate status. By receiving a notification sent by the PCF representing whether a third request is accepted or rejected, adjustment of the information of the application layer model based on an analytics result from the NWDAF can be achieved, and then QoS request is updated, to optimize AI/ML model transfer status.

In one embodiment of the present disclosure provides a method for subscribing to an analytics of model transfer status in a network, the method is applied to a network data analytic function NWDAF, and the method includes:

receiving, directly or through a network exposure function NEF, a first message sent by an application function AF, where the first message is configured to request a subscription of analytics information of artificial intelligence/machine learning AI/ML model transfer status in the network;

sending, according to a parameter requested in the first message, a second message to other network function (s) of a 5G core network 5GC NF(s), where the second message is configured to collect data for analyzing the AI/ML model transfer status in the network;

receiving the data of the AI/ML model transfer status sent by the other network function(s) of the 5G core network 5GC NF(s), and analyzing the data of the AI/ML model transfer status to obtain the analytics information of the AI/ML model transfer status;

where the analytics information is configured to adjust a network policy parameter and/or information of an application layer model through the AF.

In an embodiment, the parameter requested in the first message includes at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

In one embodiment of the present disclosure provides an apparatus for subscribing to an analytics of model transfer status in a network, the apparatus includes: a memory, a transceiver, and a processor;

the memory is configured to store computer programs; the transceiver is configured to send and receive data under a control of the processor; the processor is configured to read the computer programs in the memory and perform the following operations:

sending a first message to a network data analytic function NWDAF directly or through a network exposure function NEF, where the first message is configured to request a subscription of analytics information of artificial intelligence/machine learning AI/ML model transfer status in the network;

receiving, directly or through the NEF, the analytics information of the AI/ML model transfer status sent by the NWDAF, where the analytics information is determined by the NWDAF according to received data of the AI/ML model transfer status sent by other network function(s) of a 5G core network 5GC NF(s);

where the analytics information is configured to adjust the network policy parameter and/or information of an application layer model.

In one embodiment of the present disclosure provides an apparatus for subscribing to an analytics of model transfer status in a network, the apparatus includes: a memory, a transceiver, and a processor:

the memory is configured to store computer programs; the transceiver is configured to send and receive data under a control of the processor; the processor is configured to read the computer programs in the memory and perform the following operations:

receiving, directly or through a network exposure function NEF, a first message sent by an application function AF, where the first message is configured to request a subscription of analytics information of artificial intelligence/machine learning AI/ML model transfer status in the network;

sending, according to a parameter requested in the first message, a second message to other network function

10

(s) of a 5G core network 5GC NF(s), where the second message is configured to collect data for analyzing the AI/ML model transfer status in the network;

receiving the data of the AI/ML model transfer status sent by the other network function(s) of the 5G core network 5GC NF(s), and analyzing the data of the AI/ML model transfer status to obtain the analytics information of the AI/ML model transfer status;

where the analytics information is configured to adjust a network policy parameter and/or information of an application layer model through the AF.

In one embodiment of the present disclosure provides an apparatus for subscribing to an analytics of model transfer status in a network, the apparatus includes:

a sending unit, configured to send a first message to a network data analytic function NWDAF directly or through a network exposure function NEF, where the first message is configured to request a subscription of analytics information of artificial intelligence/machine learning AI/ML model transfer status in the network;

an analyzing unit, configured to receive, directly or through the NEF, the analytics information of the AI/ML model transfer status sent by the NWDAF, where the analytics information is determined by the NWDAF according to received data of the AI/ML model transfer status sent by other network function(s) of a 5G core network 5GC NF(s);

where the analytics information is configured to adjust a network policy parameter and/or information of an application layer model.

In one embodiment of the present disclosure provides an apparatus for subscribing to an analytics of model transfer status in a network, the apparatus includes:

a receiving unit, configured to receive, directly or through a network exposure function NEF, a first message sent by an application function AF, where the first message is configured to request a subscription of analytics information of artificial intelligence/machine learning AI/ML model transfer status in the network;

a sending unit, configured to send, according to a parameter requested in the first message, a second message to other network function(s) of a 5G core network 5GC NF(s), where the second message is configured to collect data for analyzing the AI/ML model transfer status in the network;

an analyzing unit, configured to receive the data of the AI/ML model transfer status sent by the other network function(s) of the 5G core network 5GC NF(s), and analyze the data of the AI/ML model transfer status to obtain the analytics information of the AI/ML model transfer status;

where the analytics information is configured to adjust a network policy parameter and/or information of an application layer model through the AF.

In one embodiment of the present disclosure provides a processor readable storage medium, having computer programs stored thereon, the computer programs are used to cause the processor to execute the method as described in the embodiments.

The present disclosure provides a method, an apparatus for subscribing to an analytics of model transfer status in a network, and a readable storage medium. A first message is sent to a network data analytic function NWDAF directly or through a network exposure function NEF; where the first message is configured to request a subscription of analytics information of artificial intelligence/machine learning AI/ML model transfer status in the network; analytics information of the AI/ML model transfer status sent by the NWDAF is received directly or through the NEF, where the analytics information is determined by the NWDAF according to received data of the AI/ML model transfer status sent by other network function(s) of a 5G core network 5GC NF(s), the data of the AI/ML model transfer status is obtained by the NWDAF by sending a second message to the 5GC NF(s) according to a parameter requested in the received first message, and the second message is configured to collect data for analyzing the AI/ML model transfer status in the network; where the analytics information is configured to adjust a network policy parameter and/or information of an application layer model. By sending a request of subscribing to the analytics information of the AI/ML model transfer status in the network to the NWDAF, receiving the analytics information sent by the NWDAF determined according to the collected data from the 5GC NF(s), and adjusting the network policy parameter and/or the information of the application layer model according to the analytics information, an effective analytics of the AI/ML model transfer status is conducted, to enable the network to effectively adjust a network transmission policy based on the AI/ML model transfer status and enabling the third party to obtain the analytics of the AI/ML model transfer status for adjusting information of an application layer.

It should be understood that the content described in the above summary section is not intended to limit the key or important features of the embodiments of the present disclosure, nor is it intended to limit the scope of the present disclosure. Other features of the present disclosure will become apparent from the following description.

BRIEF DESCRIPTION OF DRAWINGS

In order to illustrate the present disclosure more clearly, the drawings to be used in the embodiments or the description of the prior art will be introduced briefly in the following. The drawings in the following description are some embodiments of the present disclosure.

FIG. 7 is a schematic diagram of a signaling flow of a method for subscribing to an analytics of model transfer status in a network provided by a fourth embodiment of the present disclosure.

FIG. 8 is a schematic structural diagram of an apparatus for subscribing to an analytics of model transfer status in a network provided by an embodiment of the present disclosure.

FIG. 9 is a schematic structural diagram of an apparatus for subscribing to an analytics of model transfer status in a network provided by another embodiment of the present disclosure.

FIG. 10 is a schematic structural diagram of an apparatus for subscribing to an analytics of model transfer status in a network provided by yet another embodiment of the present disclosure.

DESCRIPTION OF EMBODIMENTS

Figures 1, 2:
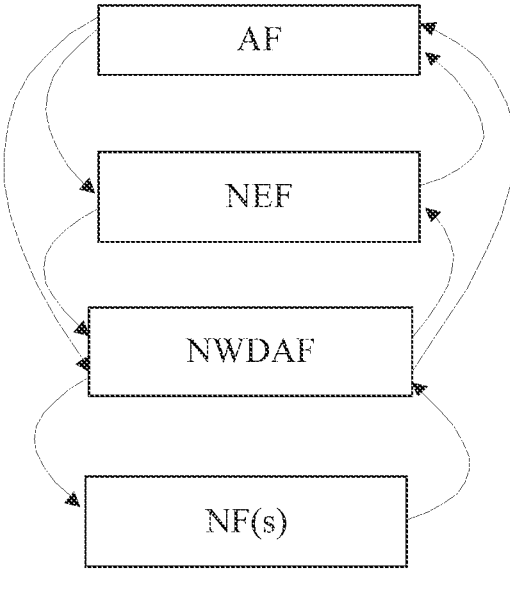
FIG. 1 is a network architecture diagram of a method for subscribing to an analytics of model transfer status in a network provided by an embodiment of the present disclosure.
FIG. 2 is a network architecture diagram of a 5GC supporting a network data analytics provided by an embodiment of the present disclosure.

The term "and/or" in the present disclosure, describes an association relationship of associated objects, represents that there may be three kinds of relationships, for example, A and/or B, it can represent three situations: A exists alone, A and B exist at the same time, and B exists alone. The character "/" generally represents that the associated objects before and after the character are in an "or" relationship.

The embodiments of the present disclosure are clearly and completely described in the following with reference to the accompanying drawings of the embodiments of the present disclosure. The described embodiments are part of embodiments of the present disclosure, not all embodiments. In order to understand the embodiments of the present disclosure clearly, the solutions of the prior art are first introduced in detail. In the prior art, in a SATR18 requirement agreed in SA #93e, there are at least the following scenarios that require an AI/ML model transfer.

Scenario 1, distribution and sharing of an AI/ML model. Due to changes in a task or an environment, a memory of a mobile terminal is limited, and it is impossible to load all models in advance. Therefore, it is necessary for the mobile terminal to download a new AI/ML model from a network in real time through a 5G system.

Scenario 2, through a 5GS federated learning algorithm. When a cloud server trains a global model, it needs to aggregate models trained locally by respective terminal devices. Each training iteration process is as follows: a terminal device downloading a global model from the cloud server and using local data for training; a terminal reporting an intermediate training result to the cloud server; the cloud server aggregating intermediate training results from all terminals and updating the global model, and then distributing the global model to the terminal; the terminal executing a next iteration.

Scenario 3, AI/ML model segmentation between AI/ML endpoints. An AI/ML model may be divided into multiple parts based on a current task or environment. A trend is that parts that are complex and energy-intensive are inferred by the network, and parts that require privacy protection or that are delay sensitive are inferred on the terminal. For example, the terminal downloads/loads a model, infers specific layers/parts first, and then sends an intermediate result to the network; then the network executes remaining layers/parts, and then feeds back an inference result to the terminal. In this scenario, transferring of a part of the model is needed in the first step or in the middle of the process, so it may include model transfer.

Therefore, the 5G system is configured as a channel for AI/ML model transfer. In order to improve an intelligence capability of a 5G network and meet a requirement for transferring the AI/ML model in the 5G system in TS 22.261 agreed in SA1 #93e, the 5G system needs to support exposure of monitoring and status information about AI-ML sessions to a third party. However, at present, without analytics about AI/ML model transfer status, the third party cannot effectively adjust their own behaviors based on the AI/ML model transfer status, and the network cannot effectively adjust network status based on the AI/ML model transfer status.

The inventor did further research and found that in order to effectively analyze the AI/ML model transfer status, interactions among an application function (AF), a network exposure function (NEF), a network data analytic function (NWDAF), and various network functions (NFs) are needed. As shown in FIG. 1, the AF may send a request to the NWDAF directly or through the NEF, the request is for subscribing to an analytics of the AI/ML model transfer status in a network. The NWDAF collects data from respective network function(s) (NF) (that is, NF(s)) in a 5G core network (5GC) to analyze the AI/ML model transfer status in the network and gives a feedback, thus achieving an effectively analytics of the AI/ML model transfer status, and the network can effectively adjust the network status based on the AI/ML model transfer status and the third party can obtain the analytics of the AI/ML model transfer status to adjust its own behavior data.

Therefore, based on above inventive research of the inventor, a method for subscribing to an analytics of model transfer status in a network according to the present disclosure is proposed. In the present disclosure, a first message is sent to a network data analytic function NWDAF directly or through a network exposure function NEF; where the first message is configured to request a subscription of analytics information of artificial intelligence/machine learning AI/ML model transfer status in the network; analytics information of the AI/ML model transfer status sent by the NWDAF is received directly or through the NEF, where the analytics information is determined by the NWDAF according to received data of the AI/ML model transfer status sent by other network function(s) (i.e., 5GC NF(s)) of a 5G core network, the data of the AI/ML model transfer status is obtained by the NWDAF by sending a second message to the 5GC NF(s) according to a parameter requested in the received first message, and the second message is configured to collect data for analyzing the AI/ML model transfer status in the network; where the analytics information is configured to adjust a network policy parameter and/or information of an application layer model. By sending a request of subscribing to the analytics information of the AI/ML model transfer status in the network to the NWDAF, receiving the analytics information sent by the NWDAF determined according to the collected data from the 5GC NF(s), and adjusting the network policy parameter and/or the information of the application layer model according to the analytics information, an effective analytics of the AI/ML model transfer status is conducted, to enable the network to effectively adjust a network transmission policy based on the AI/ML model transfer status and enabling the third party to obtain the analytics of the AI/ML model transfer status for adjusting information of an application layer.

FIG. 2 is a network architecture diagram of a 5GC supporting a network data analytics provided by an embodiment of the present disclosure. As shown in FIG. 2, in an embodiment of the present disclosure, an NWDAF is a network analyzing function managed by an operator, the NWDAF can provide a data analytics service to a 5GC network function, an applications function (AF) and an operation administration and maintenance (OAM). An analytics result may be historical statistical information or forecast information. The NWDAF may serve one or more network slices.

The 5GC may also include other various functions. They are a user plane function (UPF), a session management function (SMF), an access and mobility management function (AMF), a unified data repository (UDR), a network exposure function (NEF), the AF, a policy control function (PCF) and an online charging system (OCS). These other functions may be collectively referred to as an NF. The NWDAF communicates with other functional entity/entities 5GC NF(s) and OAM in a 5G core network based on service interface(s).

There may be different NWDAF instances that provide different types of specialized analytics in 5GC. In order for a consumer NF to find a suitable NWDAF instance to provide a specific type of analytics, the NWDAF instance needs to provide its support Analytic ID when registering with a network repository function (NRF), the Analytic ID represents an analytics type (or analytics identifier). In this way, when querying the NWDAF instance from the NRF, the consumer NF can provide the Analytic ID to indicate which type of analytics it requires. The 5GC network function and the OAM decide how to use a data analytics provided by the network data analytic function NWDAF to improve a network performance.

In an embodiment of the present disclosure, in an application scenario, the AF requests the NWDAF to provide an analytics of AI/ML model transfer status, the analytics result (or analytics information) includes: an identifier of an application (i.e. Application ID) using the AI/ML model, area information using the AI/ML model, a time period for transferring the AI/ML model, a size of an AI/ML transfer model, quality of service (i.e., QoS) related information for transferring the AI/ML model, a network slice used for the AI/ML model transfer, and data network name (DNN) information; if there is a federated learning, it also includes: a group identifier (i.e., a federated learning group ID), a UE ID or UE group ID participating in the federated learning, address information of an application server providing a model or participating in the federated learning. According to the data analytics provided by the NWDAF, the AF requests to adjust a network policy of a 5GS or adjust an application layer AI/ML model parameter to optimize the AI/ML model transfer status, the 5GC NF(s) adjust(s) the network policy based on the request or the AF adjusts the application layer AI/ML model parameter based on the data analytics.

When the AF sends an analytics request to the NWDAF, if the AF is in a trusted area, the AF may send the request to the NWDAF directly; if the AF is not in the trusted area, the AF may send the request to the NWDAF through the NEF, that is, the AF sends the request to the NEF, and then the NEF sends the request to the NWDAF.

Therefore, the request of subscribing to the analytics information of the AI/ML model transfer status in the network is sent to the NWDAF directly or through NEF, the analytics information which is sent by NWDAF and determined according to the collected data from the 5GC NF(s) is received, and the network policy parameter and/or the information of the application layer model is(are) adjusted according to the analytics information, the effective analytics of the AI/ML model transfer status is conducted, to enable the network to effectively adjust a network transmission policy based on the AI/ML model transfer status and enabling the third party to obtain the analytics of the AI/ML model transfer status for adjusting information of an application layer.

Embodiments of the present disclosure will be described below with reference to the accompanying drawings.

Figure 3:
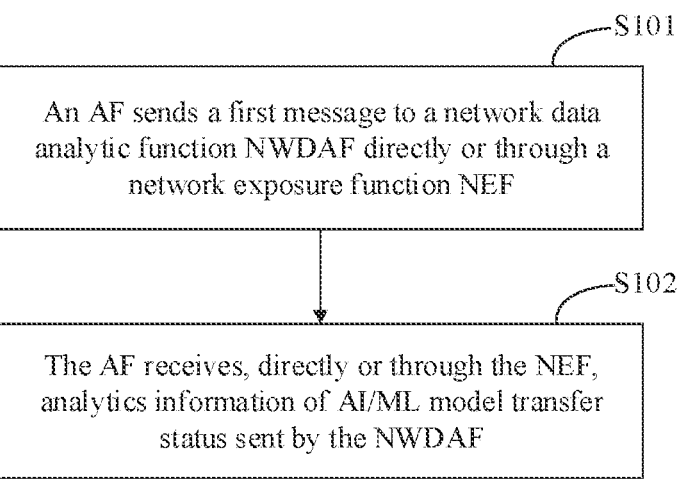
FIG. 3 is a schematic flowchart of a method for subscribing to an analytics of model transfer status in a network provided by a first embodiment of the present disclosure.

FIG. 3 is a schematic flowchart of a method for subscribing to an analytics of model transfer status in a network provided by a first embodiment of the present disclosure. As shown in FIG. 3, an executive subject of the method for subscribing to the analytics of the model transfer status in the network provided by the embodiment is an AF, the method for subscribing to the analytics of the model transfer status in the network provided by the embodiment of the present disclosure includes the following steps:

step 101, an AF sends a first message to a network data analytic function NWDAF directly or through a network exposure function NEF.

The first message is configured to request a subscription of analytics information of artificial intelligence/machine learning AI/ML model transfer status in the network.

In the embodiment, a parameter requested in the first message includes at least one of the following: a network data analytics identifier (i.e., Analytics ID), an identifier of a user equipment UE or identifiers of a group of UEs receiving the AI/ML model or an identifier of any UE that meets an analytics condition (i.e., Target of Analytics Reporting), an identifier of an application (i.e., Application ID) using the AI/ML model, an area of an AI/ML model transfer (i.e., AoI (Area of Interest)), an indication of a network slice (i.e., S-NSSAI) for a protocol data unit PDU session for a quality of service flow on which the AI/ML model is transferred, an indication of a data network (i.e., DNN) for the PDU session for the quality of service flow on which the AI/ML model is transferred, a time period of the AI/ML model transfer (i.e., Model transmission duration), a start timestamp of the AI/ML model transfer (i.e., Model transmission start), a stop timestamp of the AI/ML model transfer (i.e., Model transmission stop), a size of an AI/ML transfer model (i.e., Model size), an indication of a quality of service requirement for the quality of service flow on which the AI/ML model is transferred (i.e., 5QI (5G QoS Identifier) and/or an indication of a specific quality of service requirement for transferring the AI/ML model (i.e., QoS Characteristics).

The specific quality of service requirement, such as a packet transmission delay, a packet error rate, etc. Reference can be made to Table 1 below which is an example table of the parameter requested in the first message.

TABLE 1

| an example table of the parameter requested in the first message | | |
| --- | --- | --- |
| Parameter Name (i.e., a parameter name) | Parameter Value (i.e., a parameter value) | Parameter Description (i.e., a parameter description) |
| Analytics ID | Define a new Analytics ID, for example, AI/ML model transfer status AI/ML Model Transfer Status, or an AI/ML model transfer performance AI/ML Model Transfer Performance; | Network data analytic identifier |
| Target of Analytics Reporting | UE ID, UE group ID, or "any UE" | Identifier of a UE or identifiers of a group of UEs receiving the AI/ML model, or an identifier of any UE that meets an analytics condition (for example, within AoI) |
| Application ID | Application ID of an application using the AI/ML model | Application identifier using the AI/ML model |
| AoI (Area of Interest) | | Area of an AI/ML model transfer |
| S-NSSAI | | Indication of a network slice for a PDU session for a QoS flow on which the AI/ML model is transferred |
| DNN | | Indication of a data network for a PDU session for a QoS flow on which the AI/ML model is transferred |
| Model transmission duration | | Time period of the AI/ML model transfer |
| Model transmission start | | Start timestamp of the AI/ML model transfer |
| Model transmission stop | | Stop timestamp of the AI/ML model transfer |
| Model size | | Size of an AI/ML transfer model |

TABLE 1-continued an example table of the parameter requested in the first message

| Parameter Name (i.e., a parameter name) | Parameter Value (i.e., a parameter value) | Parameter Description (i.e., a parameter description) |
| --- | --- | --- |
| QoS requirements | Include one or more of the following parameters: | |
| >5QI (5G QoS Identifier) | 5QI of a QoS flow on which the AI/ML model is transferred, and suitable additional parameters (for example, GFBR (Guaranteed flow bit rate) of GBR 5QI), etc.) | Indication of a QoS requirement for a QoS flow of transferring the AI/ML model |
| >OoS Characteristic | Resource type Resource Type of a QoS flow (GBR, non-GBR), PDB (Packet Delay Budget) and PER (Packet Error Rate) values | Indication of a specific QoS requirement for transferring the AI/ML model, e.g., a packet transmission delay, a packet error rate, etc. |

If there is a federated learning, the parameter requested in the first message may also include: federated learning group information (i.e., Federated Learning (FL) group information); the federated learning group information includes at least one of the following: an identifier indicating a federated learning group for analytics (i.e., Federated Learning (FL) group ID), an identifier of a UE or identifier(s) of UE(s) participating in the federated learning (i.e., the Federated Learning (FL) UE ID or UE group ID), an identifier of an application participating in the federated learning (i.e., Federated Learning (FL) Application ID). Reference can be made to Table 2 below which is an example table of the parameter requested in the first message.

TABLE 2 an example table of the parameter requested in the first message

| Parameter Name | Parameter Value | Parameter Description |
| --- | --- | --- |
| Analytics ID | Define a new Analytics ID, for example, AI/ML model transfer status AI/ML Model Transfer Status, or an AI/ML model transfer performance AI/ML Model Transfer Performance; | Network data analytic identifier |
| Target of Analytics Reporting | UE ID, UE group ID, or "any UE" | Identifier of a UE or identifiers of a group of UEs receiving the AI/ML model, or an identifier of any UE that meets an analytics condition (for example, within AoI) |
| Application ID | Application ID of an application using the AI/ML model | Application identifier using the AI/ML model |
| AoI (Area of Interest) | | Area of an AI/ML model transfer |
| S-NSSAI | | Indication of a network slice for a PDU session for a QoS flow on which the AI/ML model is transferred |
| DNN | | Indication of a data network for a PDU session for a QoS flow on which the AI/ML model is transferred transferring the AI/ML model |
| Model transmission duration | | Time period of the AI/ML model transfer |
| Model transmission start | | Start timestamp of the AI/ML model transfer |
| Model transmission stop | | Stop timestamp of the AI/ML model transfer |
| Model size | | Size of an AI/ML transfer model |

TABLE 2-continued

| an example table of the parameter requested in the first message | | |
|---|---|---|
| Parameter Name | Parameter Value | Parameter Description |
| Federated Learning (FL) group information | | If yes, federated learning group information |
| >Federated Learning (FL) group ID | | If yes, federated learning group identifier, used to indicate an analytics of a federated learning group |
| >Federated Learning (FL) UE ID or UE group ID | | If yes, UE(s) participating in the federated learning |
| >Federated Learning (FL) Application ID | | If yes, an identifier of an application participating in the federated learning |
| QoS requirements | Include one or more of the following parameters: | |
| >5QI (5G QoS Identifier) | 5QI of a QoS flow on which the AI/ML model is transferred, and suitable additional parameters (for example, GFBR (Guaranteed flow bit rate) of GBR 5QI), etc) | Indication of a QoS requirement for a QoS flow of transferring the AI/ML model |
| >QoS Characteristics | Resource type Resource Type of a QoS flow (GBR, non-GBR), PDB (Packet Delay Budget) and PER (Packet Error Rate) values | Indication of a specific QoS requirement for transferring the AI/ML model, e.g., a packet transmission delay, a packet error rate, etc. |

In the embodiment, if the AF is untrusted (that is, the AF is not in a trusted area), the AF sends an AI/ML model transfer status subscription request to the NEF, such as Nnef_AnalyticsExposure_Subscribe (i.e., analytics exposure subscription) or Nnef_AnalyticsExposure_Fetch (i.e., analytics exposure fetch) request. The NEF sends the first message to the NWDAF, the first message may be an AI/ML model exposure transfer status subscription Nnwdaf_AnalyticsSubscription_Subscribe (i.e., analytics subscription subscribe) or Nnwdaf_AnalyticsInfo_Request (i.e., analytics information) request. The request may carry the parameters as shown in the table, requesting to subscribe to the analytics information of the AI/ML model transfer status in the network. If the AF is trusted (i.e., the AF is in the trusted area), the AF sends the first message directly to the NWDAF.

The AI/ML model transfer status subscription request may carry the parameters shown in Table 1 or Table 2, requesting to subscribe to the analytics information of the AI/ML model transfer in the network.

Step 102, the AF receives, directly or through the NEF, the analytics information of the AI/ML model transfer status sent by the NWDAF.

The analytics information is determined by the NWDAF according to received data of the AI/ML model transfer status sent by other network function(s) of a 5G core network 5GC NF(s).

In an embodiment, the data of the AI/ML model transfer status is obtained by the NWDAF by sending a second message to the 5GC NF(s) according to the parameter requested in the received first message, the second message is configured to collect the data for analyzing the AI/ML model transfer status in the network.

In the embodiment, the second message includes at least one of the following: a current location of a UE (i.e., UE location) using the AI/ML model, the identifier of the application using the AI/ML model (i.e., Application ID, which may be an ID of a server, or may also be an ID of the AF), an identifier of the quality of service flow (i.e., QFI) transferring the AI/ML model, a bit rate in an uplink direction (i.e., bit rate for UL direction) of transferring the AI/ML model and a bit rate in a downlink direction (i.e., bit rate for DL direction) of transferring the AI/ML model, a packet delay in the uplink direction (i.e., Packet delay for UL direction) of the AI/ML model and a packet delay in the downlink direction (i.e., Packet delay for DL direction) of the AI/ML model, the number of abnormal releases of the quality of service flow during a time period (QoS Sustainability) of the AI/ML model transfer, the number of packet transmissions (packet transmission) of the AI/ML model, the number of packet retransmissions (i.e., packet retransmission) of the AI/ML model, a data collection time (i.e., Timestamp), a duration of the AI/ML model transfer (i.e., the time period for AI/ML model transfer), a start timestamp of the AI/ML model transfer, a stop timestamp of the AI/ML model transfer, a size of the AI/ML transfer model, a network slice for a PDU session for the quality of service flow on which the AI/ML model is transferred, a data network for a PDU session for the quality of service flow on which the AI/ML model is transferred, a service process for the AF (i.e., IP filter information). Reference may be made to Table 3 below which is to an example table of the second message.

TABLE 3

| Information (i.e., data) | Source (i.e., source) | Description (i.e., data description) |
|---|---|---|
| an example table of the second message | | |
| UE location | AMF | Current location of the UE using the AI/ML model |
| Application ID | SMF, AF | Identifier of an application using the AI/ML model |
| QoS requirements | | |
| >QFI | SMF | QoS flow identifier for transferring the AI/ML model |
| >QoS flow Bit Rate | UPF | Bit rate for UL direction for transferring the AI/ML model; and bit rate for DL direction for transferring the AI/ML model |
| >QoS flow Packet Delay | UPF | Packet delay for UL direction for the AI/ML model; and Packet delay for the DL direction for the AI/ML model. |
| >QoS Sustainability | OAM TS 28.554 [10] | The number of abnormal releases of QoS Flows during a time period of the AI/ML model transfer |
| >Packet transmission | UPF | Number of packet transmissions of the AI/ML model |
| >Packet retransmission | UPF | Number of packet retransmissions of the AI/ML model |
| Timestamp | UPF, AF | Data collection time |
| Model transmission duration | UPF, AF | Duration of the AI/ML model transfer |
| Model transmission start | UPF, AF | Start timestamp of the AI/ML model transfer |
| Model transmission stop | UPF, AF | Stop timestamp of the AI/ML model transfer |
| Model size | UPF, AF | Size of the AI/ML transfer model |
| S-NSSAI | SMF | Network slice for the PDU session for the QoS flow on which the AI/ML model is transferred |
| DNN | SMF | DNN for the PDU Session for the QoS flow on which the AI/ML model is transferred |
| IP filter information | AF | Specify a service flow for the application |

If there is the federated learning, the second message further includes at least one of the following: the identifier designating the federated learning group (i.e., the Federated Learning (FL) group ID) for analytics, the UE identifier or UE(s) identifier(s) participating in the federated learning (i.e., Federated Learning (FL) UE ID or UE group ID), the identifier of the application participating in the federated learning (i.e., Federated Learning (FL) Application ID). Reference can be made to

TABLE 4

| Information (i.e., data) | Source (i.e., source) | Description (i.e., data description) |
|---|---|---|
| an example table of the second message | | |
| UE location | AMF | Current location of the UE using the AI/ML model |
| Application ID | SMF, AF | Identifier of an application using the AI/ML model |
| Federated Learning (FL) group ID | SMF, AF | If yes, indicating the federated learning group for analytics |
| Federated Learning (FL) UE ID or UE group ID | SMF, AF | If yes, UE(s) participating in the federated learning |
| Federated Learning (FL) Application ID | SMF, AF | If yes, an identifier of an application participating in the federated learning |
| QoS requirements | | |
| >QFI | SMF | QoS flow identifier for transferring the AI/ML model |
| >QoS flow Bit Rate | UPF | Bit rate for UL direction for transferring the AI/ML model; and bit rate for DL direction for transferring the AI/ML model. |

TABLE 4-continued

| Information (i.e., data) | Source (i.e., source) | Description (i.e., data description) |
| --- | --- | --- |
| | an example table of the second message | |
| >QoS flow Packet Delay | UPF | Packet delay for UL direction for the AI/ML model; and Packet delay for the DL direction for the AI/ML model. |
| >QoS Sustainability | OAM TS 28.554 [10] | Number of abnormal releases of QoS Flows during a time period of the AI/ML model transfer |
| >Packet transmission | UPF | Number of packet transmissions of the AI/ML model |
| >Packet retransmission | UPF | Number of packet retransmissions of the AI/ML model |
| Timestamp | UPF, AF | Data collection time |
| Model transmission duration | UPF, AF | Duration of the AI/ML model transfer |
| Model transmission start | UPF, AF | Start timestamp of the AI/ML model transfer |
| Model transmission stop | UPF, AF | Stop timestamp of the AI/ML model transfer |
| Model size | UPF, AF | Size of the AI/ML transfer model |
| S-NSSAI | SMF | Network slice for the PDU session for the QoS flow on which the AI/ML model is transferred |
| DNN | SMF | DNN for the PDU Session for the QoS flow on which the AI/ML model is transferred |
| IP filter information | AF | Specify a service flow for the application |

In the embodiment, if the AF is untrusted, the analytics information of the AI/ML model transfer status sent by the NEF is received, the analytics information is sent by the NWDAF to the NEF. If the AF is trusted, the analytics information of the AI/ML model transfer status sent by the NWDAF is received directly.

The analytics information includes at least one of the following: the network slice for the PDU session for the quality of service flow on which the AI/ML model is transferred, the identifier of the application using the AI/ML model, area information using the AI/ML model, a valid time (i.e. Validity period) of an analytics result, a user plane function UPF (i.e., UPF Info) providing the AI/ML model transfer, a data network name for the PDU session for the quality of service flow on which the AI/ML model is transferred, the size of the AI/ML transfer model, the duration of the AI/ML model transfer, the start timestamp of the AI/ML model transfer, the stop timestamp of the AI/ML model transfer, the quality of service requirement (i.e., QoS requirements); the quality of service requirement includes: the identifier of the quality of service flow on which the AI/ML model is transferred (i.e., QFI), the bit rate in the uplink direction for transferring the AI/ML model and the bit rate in the downlink direction for transferring the AI/ML model, the packet delay in the uplink direction for the AI/ML model and the packet delay in the downlink direction for the AI/ML model, the number of abnormal releases of the quality of service flow during the time period of the AI/ML model transfer, the number of times for which a reporting threshold for abnormal releases of the quality of service flow during the time period of the AI/ML model transfer, the number of packet transmissions of the AI/ML model is reached, the number of packet retransmissions of the AI/ML model. Reference can be made to Table 5 below which is an example table of the analytics information.

TABLE 5

| Information Analytics information list of the AI/ML model transfer status | Description |
| --- | --- |
| | an example table of the analytics information |
| >S-NSSAI | Network slice for the PDU session for the QoS flow on which the AI/ML model is transferred |
| >Application ID | Identifier of an application using the AI/ML model |
| >Validity area | Area information using the AI/ML model |
| >Validity period | Valid time of an analytics result |
| >UPF Info | UPF providing the AI/ML model transfer |
| >DNN | DNN for the PDU session for the QoS flow on which the AI/ML model is transferred |
| >Model size | Size of the AI/ML transfer model |
| >Model transmission duration | Duration of the AI/ML model transfer |
| >Model transmission start | Start timestamp of the AI/ML model transfer |

TABLE 5-continued

| an example table of the analytics information | |
|---|---|
| Information Analytics information list of the AI/ML model transfer status | Description |
| >Model transmission stop | Stop timestamp of the AI/ML model transfer |
| >QoS requirements | QoS requirement |
| >>QFI | QoS flow identifier for transferring the AI/ML model |
| >>QoS flow Bit Rate | Bit rate for UL direction for transferring the AI/ML model; and bit rate for DL direction for transferring the AI/ML model |
| >>QoS flow Packet Delay | Packet delay for UL direction for the AI/ML model; and Packet delay for the DL direction for the AI/ML model. |
| >>QoS Sustainability | Number of abnormal releases of the QoS Flows during the time period of the AI/ML model transfer |
| >>QoS Sustainability Reporting Threshold(s) | Number of times for which a reporting threshold for abnormal releases of QoS Flows during the time period of the AI/ML model transfer is reached |
| >>Packet transmission | Number of packet transmissions of the AI/ML model |
| >>Packet retransmission | Number of packet retransmissions of the AI/ML model |

If there is the federated learning, the analytics information also includes at least one of the following: the identifier indicating the federated learning group for analytics, the UE identifier or UE(s) identifier(s) participating in the federated learning, an indication of an identifier of a respective application providing the AI/ML model or participating in the federated learning (i.e., Application Server Instance Address). Reference can be made to Table 6 below which is an example table of the

TABLE 6

| an example table of the analytics information | |
|---|---|
| Information Analytics information list of the AI/ML model transfer status | Description |
| >S-NSSAI | Network slice of the PDU session for the QoS flow on which the AI/ML model is transferred |
| >Application ID | Identifier of an application using the AI/ML model |
| >Validity area | Area information using the AI/ML model |
| >Validity period | Valid time of an analytics result |
| >UPF Info | UPF providing the AI/ML model transfer |
| >DNN | DNN for the PDU session for the QoS flow on which the AI/ML model is transferred |
| >Model size | Size of the AI/ML transfer model |
| >Model transmission duration | Duration of the AI/ML model transfer |
| >Model transmission start | Start timestamp of the AI/ML model transfer |
| >Model transmission stop | Stop timestamp of the AI/ML model transfer |
| >Federated Learning (FL) group ID | If yes, indicating a group ID of federated learning |
| >>List of FL UE(s) | If yes, a UE ID or a UE group ID participating in the federated learning |
| >>Application Server Instance Address | If yes, indicating Application Server Instance(s) (IP address of the Application Server) or FQDN of Application Server providing a model or participating in the federated learning |
| >QoS requirements | QoS requirement |
| >>QFI | QoS flow identifier for transferring the AI/ML model |
| >>QoS flow Bit Rate | Bit rate for UL direction for transferring the AI/ML model; and bit rate for DL direction for transferring the AI/ML model |
| >>QoS flow Packet Delay | Packet delay for UL direction for the AI/ML model; and Packet delay for the DL direction for the AI/ML model |

TABLE 6-continued an example table of the analytics information

| Information Analytics information list of the AI/ML model transfer status | Description |
| --- | --- |
| >>QoS Sustainability | Number of abnormal releases of the QoS Flows during the time period of the AI/ML model transfer |
| >>QoS Sustainability Reporting Threshold(s) | Number of times for which a reporting threshold for abnormal releases of QoS Flows during the time period of the AI/ML model transfer is reached |
| >>Packet transmission | Number of packet transmissions of the AI/ML model |
| >>Packet retransmission | Number of packet retransmissions of the AI/ML model |

In the embodiment, by sending a request of subscribing to analytics information of AI/ML model transfer status in a network to the NWDAF, receiving analytics information which is sent by the NWDAF and determined according to the collected 5GC NF(s) data, and adjusting a network policy parameter and/or information of an application layer model according to the analytics information, an effective analytics of the AI/ML model transfer status is conducted, to enable the network to effectively adjust a network transmission policy based on the AI/ML model transfer status and enabling a third party to obtain the analytics of the AI/ML model transfer status for adjusting information of an application layer.

Figure 4:
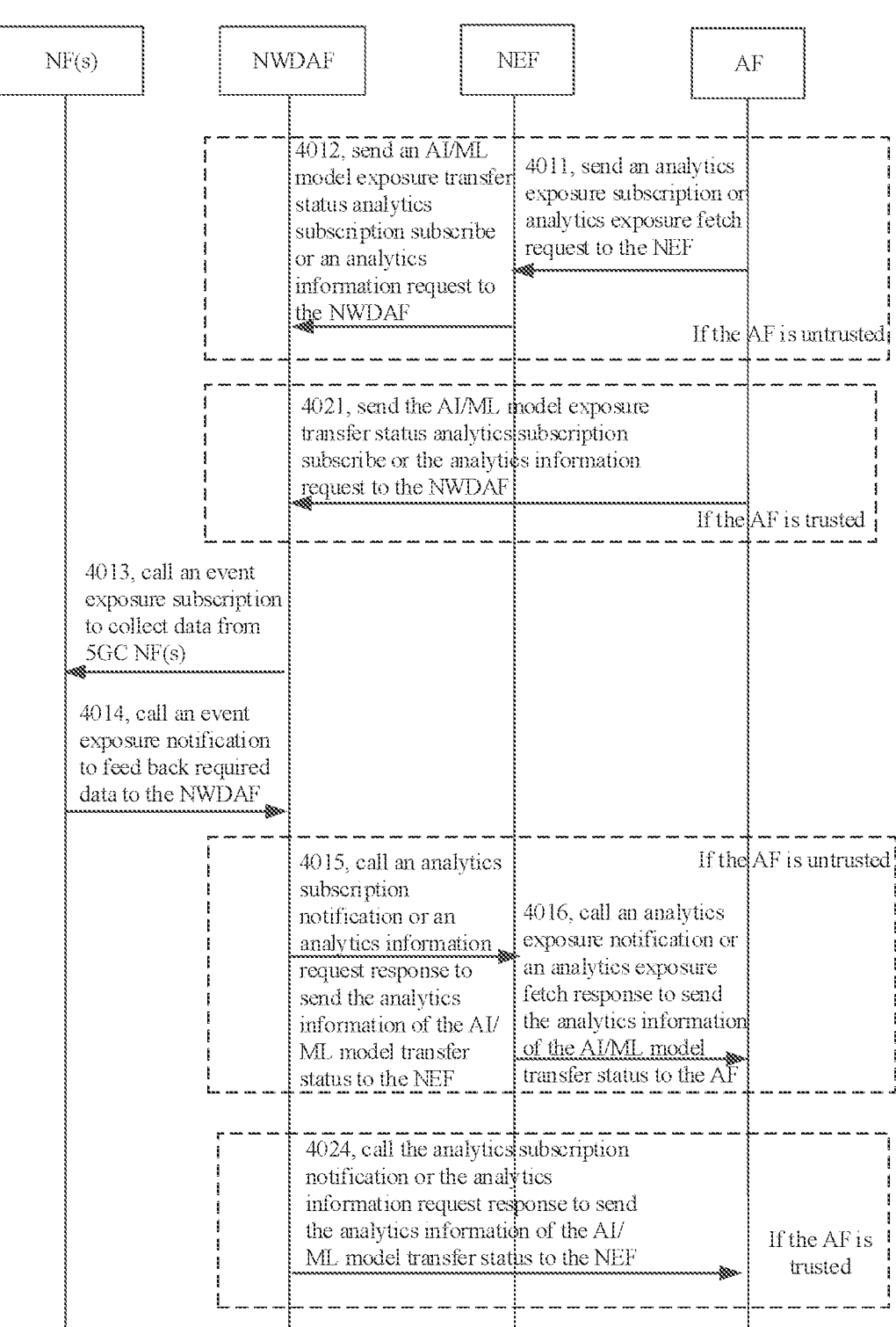
FIG. 4 is a schematic diagram of a signaling flow of a method for subscribing to an analytics of model transfer status in a network provided by a first embodiment of the present disclosure.

Exemplarily, refer to FIG. 4. FIG. 4 is a schematic diagram of a signaling flow of a method for subscribing to an analytics of model transfer status in a network provided by a first embodiment of the present disclosure. FIG. 4 is a signaling interaction diagram among an AF, an NWDAF, an NEF and an NF in the method for subscribing to the analytics of the model transfer status in the network. The method for subscribing to the analytics of the model transfer status in the network provided by the embodiment includes the following steps (i.e., a signaling interaction process corresponding to the first embodiment: the AF requesting the NWDAF to provide the analytics of the AI/ML model transfer status): (where steps 4011 to 4016 are for the case where the AF is in an untrusted area, and steps 4021 to 4024 are for the case where the AF is in a trusted area.)

Step 4011, if the AF is untrusted, the AF sends an AI/ML model transfer status subscription Nnef_Analytics Exposure_Subscribe (i.e., analytics exposure subscription) or Nnef_AnalyticsExposure_Fetch (i.e., analytics exposure fetch) request to the NEF.

In the embodiment, the request may carry the parameters shown in Table 1 or Table 2, requesting to subscribe to the analytics information of the AI/ML model transfer status in the network.

Step 4012, the NEF sends an AI/ML model exposure transfer status subscription Nnwdaf_Analytics Subscription_Subscribe (i.e., analytics subscription subscribe) or an Nnwdaf_AnalyticsInfo_Request (i.e., analytics information) request to NWDAF.

Among them, the AI/ML model exposure transfer status subscription Nnwdaf_AnalyticsSubscription_Subscribe or Nnwdaf_AnalyticsInfo_Request request may be used as the first message.

In the embodiment, the request may carry the parameters shown in Table 1 or Table 2, requesting to subscribe to the analytics information of the AI/ML model transfer status in the network.

Step 4013, the NWDAF calls an Nnf_Event Exposure_Subscribe (i.e., event exposure subscription) to collect data from 5GC NF(s).

The collected data is shown in Table 3 or Table 4, which is configured to analyze the AI/ML model transfer status in the network. A manner in which the NWDAF sends the second message to the 5GC NF(s) may be that the NWDAF calls the Nnf_EventExposure_Subscribe.

Step 4014, the 5GC NF(s) calls an Nnf_EventExposure_Notify (i.e., event exposure notification) to feedback required data to the NWDAF.

Step 4015, the NWDAF calls an Nnwdaf_AnalyticsSubscription_Notify (i.e., analytics subscription notification) or an Nnwdaf_AnalyticsInfo_Request response (i.e., analytics information request response) to send the analytics information of the AI/ML model transfer status to the NEF.

Step 4016, the NEF calls a Nnef_AnalyticsExposure_Notify (i.e., analytics exposure notification) or a Nnef_AnalyticsExposure_Fetch response (i.e., analytics exposure fetch response) to send the analytics information of the AI/ML model transfer status to the AF.

The analytics information is shown in Table 5 or Table 6.

Step 4021, if the AF is trusted, the AF sends an AI/ML model transfer status subscription request to the NWDAF directly, and an operation to be executed is as described in step 4012. In addition, a consumer may also be a PCF, an SMF.

Step 4022, the operation to be executed is as described in step 4013. That is, step 4013.

Step 4023, the operation to be executed is as described in step 4014. That is, step 4014.

Step 4024, the NWDAF directly sends the analytics information of the AI/ML model transfer status to the AF, and the operation to be executed is as described in step 4016.

In a second embodiment, after the analytics information is received, the method further includes:

sending, according to the analytics information, a first request to a policy control function PCF directly or through the NEF.

The first request is configured to request an update of a network policy parameter for the AI/ML model transfer, and the network policy parameter is configured to optimize the AI/ML model transfer status.

Specifically, based on an analytics result from the NWDAF, the AF requests to adjust a network policy to optimize the AI/ML model transfer status. Specifically, if the AF is in a trusted area, the AF directly sends the first request to the PCF, requesting the PCF to update the network policy parameter used for the AI/ML model transfer. If the AF is not in the trusted area, the AF sends the first request to the PCF through the NEF, requesting the PCF to update the network policy parameter used for the AI/ML model transfer.

In an embodiment, the sending, according to the analytics information, the first request to the policy control function PCF directly or through the NEF may be implemented through the following steps.

Step a1, determine, according to at least one of a bit rate in an uplink direction for transferring an AI/ML model and a bit rate in a downlink direction for transferring the AI/ML model, a packet delay in an uplink direction for an AI/ML model and a packet delay in a downlink direction for the AI/ML model, a number of abnormal releases of a quality of service flow during a time period of an AI/ML model transfer or a number of times for which a reporting threshold for abnormal releases of a quality of service flow during a time period of an AI/ML model transfer in the analytics information is reached, a new quality of service parameter for transferring the AI/ML model, wherein the new quality of service parameter comprises at least one of the following: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow.

Step a2, determine, according to the identifier of the application using the AI/ML model, the area information using the AI/ML model, IP address information of an application service using the AI/ML model, the network slice for the PDU session for the quality of service flow on which the AI/ML model is transferred and the name of the data network for the PDU session for the quality of service flow on which the AI/ML model is transferred in the analytics information, area information and address information of UE(s) and a respective AF transferring the AI/ML model; or, if the AI/ML model performs a federated learning, determining, according to the identifier indicating the federated learning group for analytics, the identifier of the UE or the identifier(s) of the UE(s) participating in the federated learning, the indication of the identifier of the respective application providing the AI/ML model or participating in the federated learning in the analytics information, area information and address information of UE(s) and a respective AF transferring the AI/ML model.

Step a3, determine, according to the area information and the address information of the UE(s) and the respective AF transferring the AI/ML model, a data network access identifier DNAI and area information and address information of UE(s) and a respective AF corresponding to the DNAI, wherein the area information and the address information of the UE(s) and the respective AF corresponding to the DNAI are used to provide a path for optimization of the AI/ML model transfer status.

Step a4, send the new quality of service parameter, the DNAI, and the area information and the address information of the UE(s) and the respective AF corresponding to the DNAI to the PCF as the parameter requested in the first request directly or through the NEF.

Specifically, the AF determines a new QoS parameter for transferring the AI/ML model in accordance with the analytics information for transferring the AI/ML model acquired from the NWDAF, the analytics information may be, e.g., the bit rate in the uplink direction for transferring the AI/ML model and the bit rate in the downlink direction for transferring the AI/ML model, the packet delay in the uplink direction for the AI/ML model and the packet delay in the downlink direction for the AI/ML model, the number of abnormal releases of the quality of service flow during the time period of the AI/ML model transfer, and the number of times for which the reporting threshold for abnormal releases of the quality of service flow during the time period of the AI/ML model transfer is reached, and provides the new QoS parameter to the PCF.

The AF determines the area information and the address information of the UE(s) and the respective AF(s) for transferring the AI/ML model in accordance with the analytics information for transferring the AI/ML model acquired from the NWDAF, such as: the identifier of the application using the AI/ML model, the area information using the AI/ML model, IP address information of the application service using the AI/ML model, the network slice for the PDU session of the quality of service flow on which the AI/ML model is transferred and the data network name for the PDU session for the quality of service flow on which the AI/ML model is transferred in the analytics information, or, in accordance with the analytics information for transferring the AI/ML model acquired from the NWDAF, such as: the identifier indicating the federated learning group for analytics, the UE identifier or UE(s) identifier(s) participating in the federated learning, the indication of the identifier of the respective application providing the AI/ML model or participating in the federated learning, and then determines the data network access identifier DNAI and the area information and the address information of the UE(s) and the respective AF corresponding to the DNAI. The AF sends the first request carrying the new QoS parameter, the DNAI, and the area information and the address information of the UE(s) and the respective AF corresponding to the DNAI to the PCF directly or through the NEF, and requests the PCF to update a related policy parameter for the AI/ML model transfer to optimize the AI/ML model transfer status in accordance with a requested parameter carried in the first request.

In an embodiment, the step a3 may be implemented through the following steps:

step a31, determine, according to the area information and the address information of the UE(s) and the respective AF transferring the AI/ML model, whether a current routing path is not good;

step a32, if the current routing path is not good, determine, according to the address information of the UE(s) and the respective AF transferring the AI/ML model and the area information of the UE(s), destination addresses of both transferring parties in the AI/ML model;

step a33, determine, according to the destination addresses, a nearest path;

step a34, determine, according to the nearest path, the DNAI and the area information and the address information of the UE(s) and the respective AF corresponding to the DNAI.

Specifically, when the current routing path is determined as not good, the DNAI that can provide a better service experience or performance is selected, the DNAI for the AI/ML model transfer and the area information and the addresses information of corresponding to UE(s) and AF(s) are provided to the PCF.

In an embodiment, the first request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter, and indicate the PCF to feedback a first update result adjusted directly or through the NEF; where the first update result is determined by the PCF according to a result of the adjustment of the PCC rule based on the new quality of service parameter;

correspondingly, the method further includes:

receiving, directly or through the NEF, the first update result sent by the PCF, where the first update result includes the first request being accepted or the first request being rejected.

Specifically, the AF requests the PCF to correspondingly adjust, according to the new QoS parameter, the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in the PCC rule, and the first update result is notified directly or through the NEF, that is, the AF is notified whether the request is accepted or rejected.

In an embodiment, the first request is specifically used to:

request the PCF to determine whether a session management function SMF network element needs to update a session management policy, if it is determined that the SMF needs to update the session management policy, then determine that the PCF sends a second request to the SMF, where a parameter requested in the second request includes at least one of the following: a DNAI, a traffic steering policy identifier, traffic route information, and the second request is configured by the SMF to determine the selected user plane function UPF according to a new session management policy and provide a corresponding DNAI, a corresponding traffic steering policy identifier, and corresponding traffic route information;

correspondingly, the method further includes:

receiving, directly or through the NEF, a second update result sent by the PCF, where the second update result is determined by the PCF according to whether a UPF path is updated on account of the new session management policy sent by the SMF;

where the second update result includes the second request being accepted or the first request being rejected.

Specifically, the AF requests the PCF to determine whether the session management function SMF network element needs to update the session management policy. If the PCF determines that the SMF needs to update policy information, the PCF will issue the second request to the SMF carrying the DNAI, the traffic steering policy identifier, the traffic route information, and other requested parameters. The SMF determines the selected user plane function UPF according to the new session management policy and provides the corresponding DNAI, traffic steering policy identifier, and traffic route information to update the session management policy, that is, to update the SM policy. And the PCF notifies the second update result directly or through the NEF, that is, notifies the AF whether the request is accepted or rejected.

Figure 5:
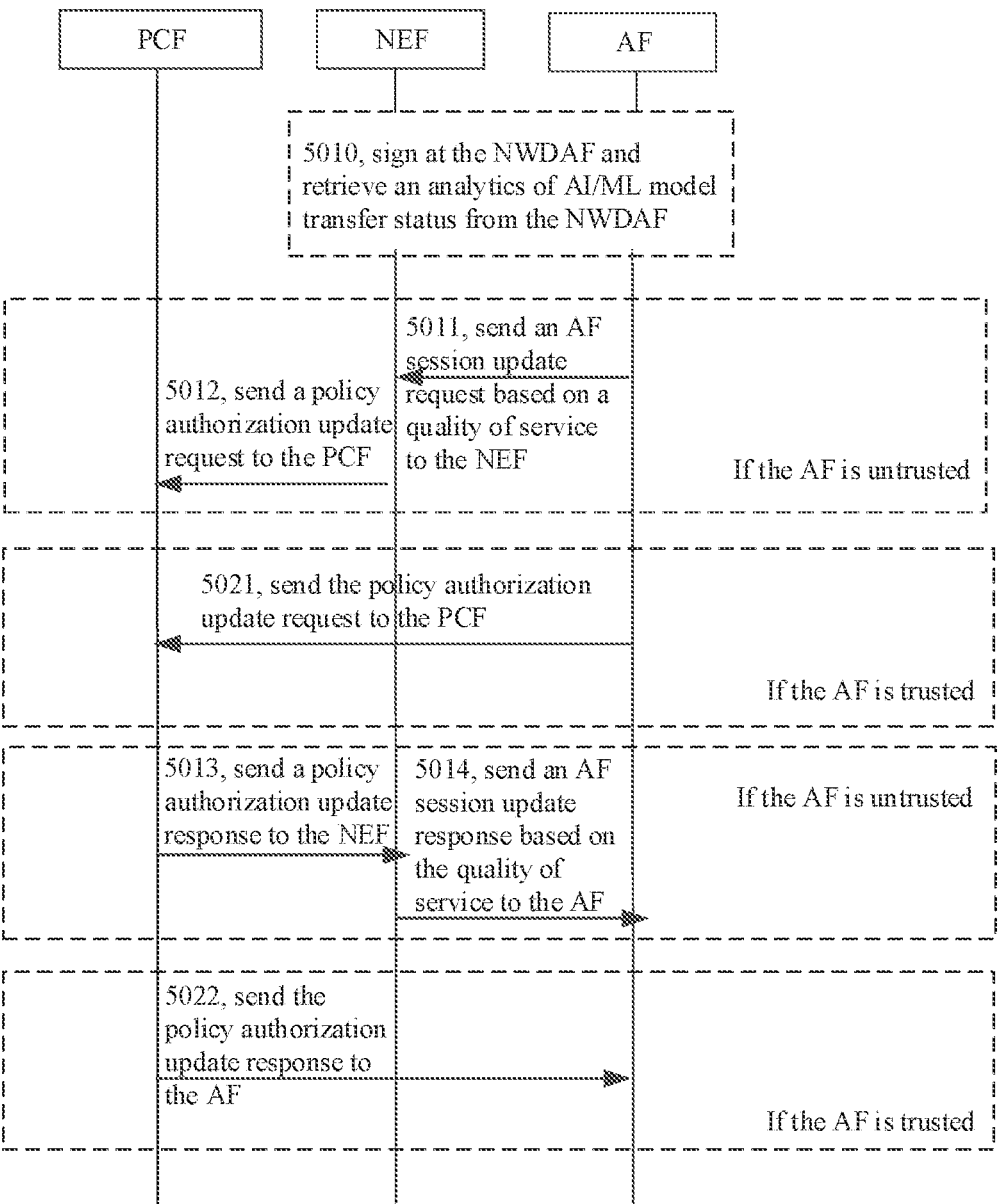
FIG. 5 is a schematic diagram of a signaling flow of a method for subscribing to an analytics of model transfer status in a network provided by a second embodiment of the present disclosure.

Exemplarily, refer to FIG. 5, which is a schematic diagram of a signaling flow of a method for subscribing to an analytics of model transfer status in a network provided by a second embodiment of the present disclosure. FIG. 5 is a signaling interaction diagram among an AF, an NEF and a PCF. The method for subscribing to the analytics of the model transfer status in the network provided by the embodiment includes the following steps (i.e., a signaling interaction process corresponding to the second embodiment: based on an analytics result from the NWDAF, the AF requesting to adjust a network policy to optimize the AI/ML model transfer status): (where steps 5011 to 5014 are for the case where the AF is in an untrusted area, and steps 5021 to 5022 are for the case where the AF is in a trusted area.)

Step 5010, the AF signs at the NWDAF and retrieves the analytics of the AI/ML model transfer status from the NWDAF.

In the embodiment, the AF subscribes to the NWDAF through the NEF or directly and obtains the analytics of the AI/ML model transfer status, as described above in steps 4011 to 4024.

Step 5011, AF sends a Nnef_AFsessionWithQoS_Update (i.e., an AF session update based on a quality of service) request to the NEF.

In the embodiment, if the AF is not trusted, for an AF session (i.e., AF session) that has been established and has a QoS requirement, the AF may send the Nnef_AFsessionWithQoS_Update (i.e., the AF session update based on the quality of service) request to the NEF to update a related policy parameter for the AI/ML model transfer to optimize the AI/ML model transfer status.

Specifically, AF determines the new QoS parameter for transferring the AI/ML model in accordance with the analytics information for transferring the AI/ML model obtained from the NWDAF: a QoS flow Bit Rate (i.e., a bit rate of a quality of service flow, such as: a bit rate in an uplink direction for transferring the AI/ML model and a bit rate in a downlink direction for transferring the AI/ML model), a QoS flow Packet Delay (i.e., a packet delay of the quality of service flow, such as: the packet delay in the uplink direction for the AI/ML model and the packet delay in the downlink direction for the AI/ML model), QoS Sustainability, Packet transmission, Packet retransmission, and QoS Sustainability Reporting Threshold(s), and the AF provides to a PCF the new QoS parameter: a 5G QoS Identifier (5QI, i.e., 5G quality of service identifier), a Reflective QoS Control (i.e., a reflective quality of service control), an UL-maximum bitrate (i.e., a maximum bit rate in the uplink direction for transferring the AI/ML model), a DL-maximum bitrate (i.e., the maximum bit rate in the downlink direction for transferring the AI/ML model), a UL-guaranteed bitrate (i.e., the lowest bit rate in the uplink direction for transferring the AI/ML model), a DL-guaranteed bitrate (the lowest bit rate in the downlink direction for transferring the AI/ML model), a Priority Level (i.e., a priority). That is, these parameters increase or decrease with the increase or decrease of a prediction result to make a 5GS meet a QoS requirement for model transfer.

In addition, AF determines area information and address information of UE(s) and AF(s) transferring the AI/ML model in accordance with the analytics information for transferring the AI/ML model obtained from the NWDAF: an AF ID for transferring the AI/ML model, UE area information using the AI/ML model, IP address information of an application service using the AI/ML model, a network slice used for the AI/ML model transfer, and DNN information. Or, the analytics information may also have information about federated learning group information: a Federated Learning (FL) group ID, a Federated Learning (FL) UE ID or UE group ID, an Application ID of a Federated Learning (FL), the AF determines the area information and the address information of UE(s) and AF(s) for transferring the AI/ML model, determines that a current routing path is not good, selects a DNAI that can provide a better service experience or performance, and provides the DNAI and area information and address information of corresponding UE(s) and AF(s) for transferring the AI/ML model to PCF.

A process of determining that the current routing path is not good may be: the AF determining the current routing path based on IP address information of the AF, the area information of UE(s) (it can correspond to an ID of an AMF, an ID of an SMF, an ID of a UPF, etc., and an N6 interface of the UPF is connected to a DN); for example, if some UEs/servers join/leave (federated group) before a next transmission, then some paths are not good, or if there are too many hops, the path is not good.

A process of selecting the DNAI that can provide the better service experience or performance can be: determining destination addresses of both transmission parties based on the received IP address information and the area information of the UE(s), a better (nearest) routing path can be found, which corresponds to a DNAI.

Step 5012, the NEF sends an Npcf_Policy Authorization_Update request (i.e., a policy authorization update request) to the PCF.

In the embodiment, the NEF sends the above information to the PCF through the Npcf_PolicyAuthorization_Update request (i.e., the policy authorization update request) to update a related policy parameter for the AI/ML model transfer to optimize the AI/ML model transfer status.

The Npcf_PolicyAuthorization_Update request may be used as a second request.

Step 5013, the PCF notifies the NEF of a result (i.e., the PCF sends an Npcf_PolicyAuthorization_Update response (policy authorization update response) to the NEF.

In the embodiment, the PCF adjusts the 5G QoS Identifier (5QI), the Reflective QoS Control, the UL-maximum bitrate, the DL-maximum bitrate, the UL-guaranteed bitrate, the DL-guaranteed bitrate, the Priority Level in the PCC rule in accordance with the information provided by the NEF, specifically, in accordance with the provided new QoS parameter, and sends the Npcf_PolicyAuthorization_Update response (policy authorization update response) to notify the NEF of the result.

If the PCF determines that the SMF needs to update policy information, the PCF will issue an Npcf_SMPolicyControl_UpdateNotify request (i.e., session policy control update notification request) (DNAI, Per DNAI: Traffic steering policy identifier, Per DNAI: N6 traffic routing policy) to the SMF to update an SM policy, the SMF selects the UPF in accordance with this policy, and provides the DNAI; Per DNAI: Traffic steering policy identifier, Per DNAI: N6 traffic routing information (traffic routing information). The Npcf_SMPolicyControl_UpdateNotify request may be used as the second request.

Step 5014, NEF sends a Nnef_AFsessionWithQoS_Update response to the AF.

In this embodiment, the NEF sends the Nnef_AFsessionWithQoS_Update response (that is, an AF session update response based on the quality of service) to notify the AF whether the request is accepted or rejected.

Step 5021, the AF sends the Npcf_PolicyAuthorization_Update request to the PCF directly.

In the embodiment, if the AF is trusted, the AF sends the Npcf_PolicyAuthorization_Update request to the PCF directly to update a related policy parameter for the AI/ML model transfer to optimize the AI/ML model transfer status, and an operation to be executed is as described in step 5012.

In step 5022, the PCF notifies the AF of the result directly (i.e., the PCF sends the Npcf_PolicyAuthorization_Update response (i.e., the policy authorization update response) directly to the AF).

In the embodiment, first, the PCF executes an operation as described in step 5012 in accordance with the information provided by the AF. The PCF notifies the AF directly whether the request is accepted or rejected.

In a third embodiment, after the analytics information is received, the method may also be implemented through the following steps:

step b1, adjust, according to the analytics information, the information of the application layer model, where the information of the application layer model includes at least one of: model compression, a model size, a model transmission time period, model encoding and decoding; the information of the application layer model is configured to update a quality of service parameter;

step b2, determine, according to the adjusted information of the application layer model, a new quality of service parameter, where the new quality of service parameter includes: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

step b3, send a third request to a policy control function PCF directly or through the NEF;

where a parameter requested in the third request includes the new quality of service parameter, and the third request is configured to request an update of a quality of service parameter.

Specifically, based on QoS requirement information provided by the NWDAF, the AF adjusts the information of the application layer model to update the quality of service parameter, such as: adjusting the model compression, the model size, the model transmission time period, the model encoding and decoding, etc. The AF determines the new quality of service parameter according to the adjusted information of the application layer model, directly or through the NEF, the third request carrying the new quality of service parameter is sent to the PCF.

In an embodiment, the third request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter;

correspondingly, the method further includes:

receiving, directly or through the NEF, a third update result sent by the PCF, where the third update result is determined by the PCF based on a result of the adjustment of the PCC rule, and the third update result includes the third request being accepted or the third request being rejected.

Specifically, the AF requests the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in the PCC (i.e., a policy and charging control) rule in accordance with the provided new QoS parameter, the PCF adjusts the PCC rule and notifies the AF directly or through the NEF whether the request is accepted or rejected.

In an embodiment, after the information of the application layer model is adjusted, the method may also be implemented through the following steps:

sending model compression, a model size and model encoding and decoding in the adjusted information of the application layer model directly to the PCF, where the adjusted information of the application layer model is configured to support the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow in a PCC rule;

correspondingly, the method further includes:

receiving a fourth update result sent by the PCF, where the fourth update result is determined by the PCF according to a result of the adjustment of the PCC rule based on the adjusted information of the application layer model, and the fourth update result includes the third request being accepted or the first request being rejected.

Specifically, the PCF adjusts the above QoS parameters in the PCC rule in accordance with the model compression, the model size, and the model encoding and decoding, e.g., the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow. The PCF adjusts the PCC rule and notifies the AF directly or through the NEF whether the request is accepted or rejected.

In an embodiment, after the information of the application layer model is adjusted, the method further includes:

sending the model transmission time period in the adjusted information of the application layer model directly to the PCF, where the model transmission time period in the adjusted information of the application layer model is configured to support the PCF to adjust a gate status parameter in a PCC rule, and the gate status parameter is configured to support the SMF to update a session management policy according to a transmission start time and a transmission stop time in a gate status;

correspondingly, the method further includes:

receiving a fifth update result sent by the PCF, where the fifth update result is determined by the PCF by receiving a result of a new session management policy sent by the SMF, and the fifth update result includes the third request being accepted or the third request being rejected.

Specifically, in accordance with the model transmission time, the PCF adjusts the Gate status (i.e., the gate status parameter) in the PCC rule and updates the SM policy. The SMF gives feedback to the PCF in accordance with a transmission start time and a transmission stop time which affect the flow, and notifies the AF directly or through the NEF whether the request is accepted or rejected.

Figure 6:
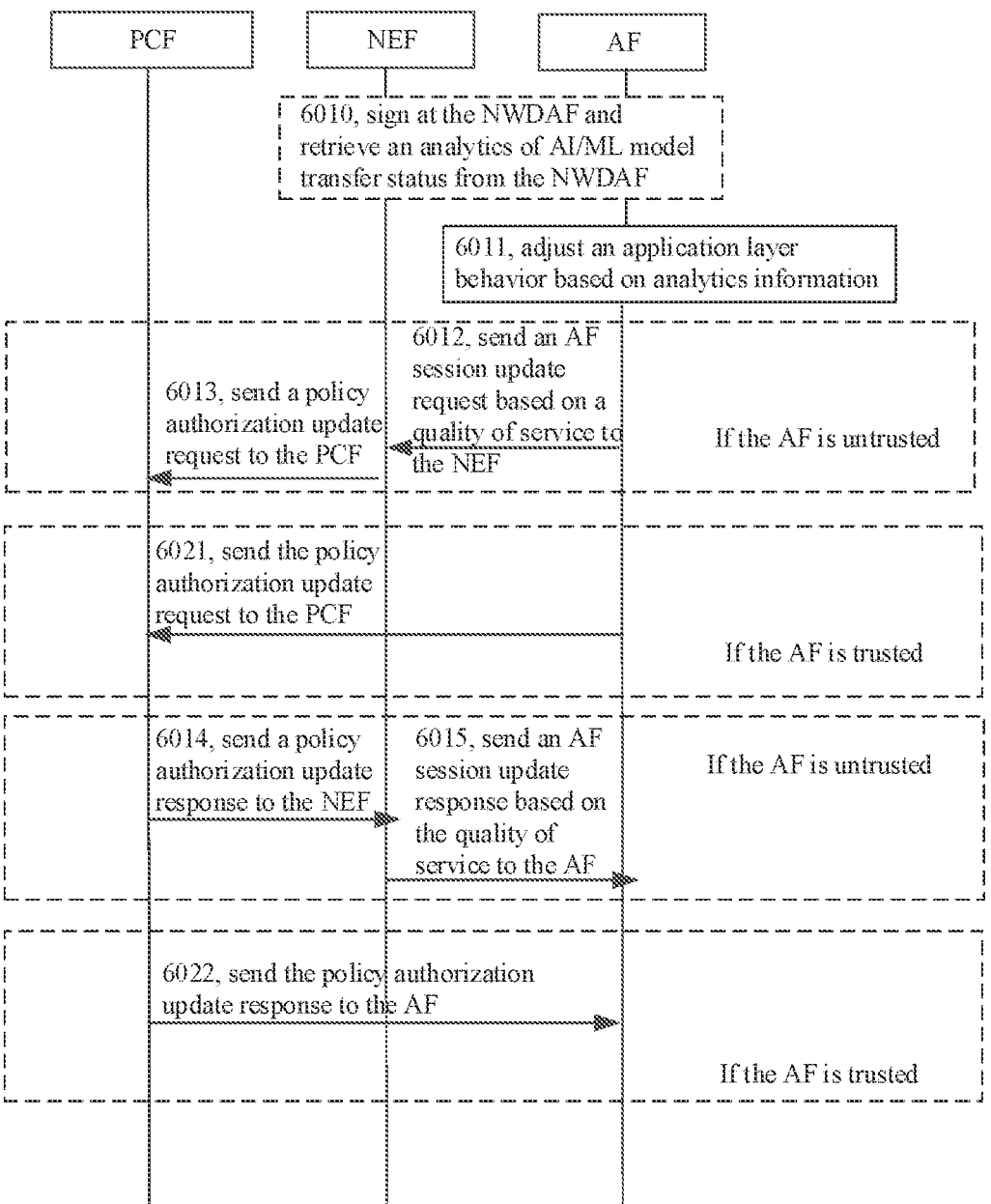
FIG. 6 is a schematic diagram of a signaling flow of a method for subscribing to an analytics of model transfer status in a network provided by a third embodiment of the present disclosure.

Exemplarily, refer to FIG. 6. FIG. 6 is a schematic diagram of a signaling flow of a method for subscribing to an analytics of model transfer status in a network provided by a third embodiment of the present disclosure. FIG. 6 is a signaling interaction diagram among an AF, an NEF and an NF in the method for subscribing to the analytics of the model transfer status in the network. The method for subscribing to the analytics of the model transfer status in the network provided by the embodiment includes the following steps (i.e., a signaling interaction process corresponding to the third embodiment: the AF adjusting, based on analytics information provided by the NWDAF, information of an application layer model, such as, adjusting a model compression, a model size, a model transmission time period, model encoding and decoding, etc., and then updating a QoS requirement, which is similar to the step flows of the second embodiment): (where steps 6012 to 6014 are for the case where the AF is in an untrusted area, and steps 6021 to 6022 are for the case where the AF is in a trusted area.)

Step 6010, the AF signs at the NWDAF and retrieves the analytics of the AI/ML model transfer status from the NWDAF.

Specifically, the AF subscribes to the NWDAF through the NEF or directly and obtains the analytics of the AI/ML model transfer status, as described above in steps 4011 to 4024.

Step 6011, the AF adjusts an application layer behavior based on the analytics information.

In the embodiment, the AF adjusts the information of the application layer model based on the QoS requirement information provided by the NWDAF, such as adjusting model compression, model size, model transmission time period, and model encoding and decoding.

Step 6012, the AF sends a Nnef_AFsessionWithQoS_Update request to the NEF.

Step 6013, the NEF sends an Npcf_Policy Authorization_Update request to the PCF.

The Npcf_PolicyAuthorization_Update request may be used as a third request.

Step 6014, the PCF notifies the NEF of a result (i.e., the PCF sends an Npcf_PolicyAuthorization_Update response to the NEF).

Step 6015, the NEF sends a Nnef_AFsessionWithQoS_Update response to the AF.

Step 6021, the AF sends the Npcf_Policy Authorization_Update request to the PCF directly.

Step 6022, the PCF notifies the AF of the result directly (i.e., the PCF sends the Npcf_PolicyAuthorization_Update response (i.e., a policy authorization update response) to the AF directly).

Specifically, the AF requests a session to update the QoS. Specifically, the AF determines a new QoS parameter for transferring the AI/ML model based on an adjusted model compression, model size, model transmission time period, model encoding and decoding, etc., and provides the new QoS parameter to the PCF: a 5G QoS Identifier (5QI), a Reflective QoS Control, an UL-maximum bitrate, a DL-maximum bitrate, an UL-guaranteed bitrate, a DL-guaranteed bitrate, a Priority Level. Or, the AF sends adjustment information including the model compression, the model size, the model transmission time period, the model encoding and decoding or the like to the PCF directly.

Step 6013, the PCF adjusts the 5G QoS Identifier (5QI), the Reflective QoS Control, the UL-maximum bitrate, the DL-maximum bitrate, the UL-guaranteed bitrate, the DL-guaranteed bitrate, the Priority Level in a PCC rule in accordance with the provided new QoS parameter; or the PCF adjusts the above QoS parameters in the PCC rule in accordance with the model compression, the model size, and the model encoding and decoding; or the PCF adjusts Gate status in the PCC rule and updates an SM policy in accordance with the model transmission time period, and the SMF gives feedback to the PCF in accordance with a transmission start time and a transmission stop time which affect the flow; finally, the PCF notifies the AF whether the request is accepted or rejected by means of step 5014 or 5022 in the second embodiment.

In the present disclosure, an NWDAF receives an analytics request (as well as a parameter contained in the request) for AI/ML model transfer status sent by an AF; input data collected by the NWDAF from 5GC NF(s) is configured to analyze the AI/ML model transfer status in a network; the NWDAF performs an analytics and sends analytics information of the AI/ML model transfer status to the AF; the AF requests a QoS update of an AF session based on the analytics information of the AI/ML model transfer status, and adjusts policies of a corresponding policy control function PCF, a session management function SMF network element and other network elements; the AF adjusts a related parameter of information of an application layer model based on the analytics information of the AI/ML model transfer status, and then adjusts the QoS, thereby optimizing the AI/ML model transfer status. In this way, a third party may obtain the AI/ML model transfer status, the network may adjust its own behavior to meet a transmission requirement of the AI/ML model based on an analytics result of the model transfer, and the third party may also adjust a behavior of the model application layer based on the analytics result of the model transfer to achieve an efficient transfer of the AI/ML model and ensure a business experience and a business performance of the AI/ML model transfer.

FIG. 7 is a schematic flowchart of a method for subscribing to an analytics of model transfer status in a network provided by a fourth embodiment of the present disclosure. As shown in FIG. 7, an executive subject of the method for subscribing to the analytics of the model transfer status in the network provided by the embodiment is an NWDAF, then the method for subscribing to the analytics of the model transfer status in the network provided by the embodiment of the present disclosure includes the following steps:

step 701, the NWDAF receives, directly or through a network exposure function NEF, a first message sent by an application function AF, where the first message is configured to request a subscription of analytics information of artificial intelligence/machine learning AI/ML model transfer status in the network;

step 702, the NWDAF sends, according to a parameter requested in the first message, a second message to other network function(s) of a 5G core network 5GC NF(s), where the second message is configured to collect data for analyzing the AI/ML model transfer status in the network.

step 703, the NWDAF receives the data of the AI/ML model transfer status sent by the other network function (s) of the 5G core network 5GC NF(s), and analyzes the data of the AI/ML model transfer status to obtain the analytics information of the AI/ML model transfer status.

The analytics information is configured to adjust a network policy parameter and/or information of an application layer model through the AF.

In an embodiment, the parameter requested in the first message comprises at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

if the AI/ML model performs a federated learning, the parameter requested in the first message further includes: federated learning group information, and the federated learning group information comprises at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

In the embodiment, by receiving a request for subscribing to analytics information of AI/ML model transfer status in a network sent by an AF, collecting data from other network function(s) of a 5G core network 5GC NF(s) according to a parameter requested in a first message, receiving the data of the AI/ML model transfer status sent by the other network function(s) of the 5G core network 5GC NF(s), and analyzing the data of the AI/ML model transfer status to obtain the analytics information of the AI/ML model transfer status, thus conducting an effective analytics of the AI/ML model transfer status, and enabling the AF to adjust a network policy parameter and/or information of an application layer model according to the analytics information, to enable the network to effectively adjust a network transmission policy based on the AI/ML model transfer status and enabling the third party to obtain the analytics of the AI/ML model transfer status for adjusting information of an application layer.

It should be noted that the method for subscribing to the analytics of the model transfer status in the network provided by the embodiment of the present disclosure can realize all the method steps realized by the method embodiment shown in FIG. 4 and can achieve the same effects, the same parts and beneficial effects between this embodiment and the method embodiment are not repeated in detail.

FIG. 8 is a schematic structural diagram of an apparatus for subscribing to an analytics of model transfer status in a network provided by an embodiment of the present disclosure. As shown in FIG. 8, the apparatus for subscribing to the analytics of the model transfer status in the network provided by the embodiment is applied to an AF. The apparatus for subscribing to the analytics of the model transfer status in the network provided in the embodiment includes: a transceiver 800, configured to receive and send data under a control of a processor 810.

In FIG. 8, a bus architecture may include any number of interconnected buses and bridges, specifically, one or more processors represented by the processor 810 and various circuits of the memory represented by the memory 820 are linked together. The bus architecture may also link various other circuits together, such as peripherals, voltage regulators, and power management circuits, which are well known in the art and, therefore, will not be described further herein. A bus interface provides an interface. The transceiver 800 may be multiple elements, i.e., including a transmitter and a receiver, providing elements for communicating with various other apparatuses over transmission mediums, these transmission mediums include wireless channels, wired channels, fiber optic cables, and other transmission mediums. The processor 810 is responsible for managing the bus architecture and general processing, and the memory 820 may store data used by the processor 810 when performing operations.

The processor 810 may be a central processing unit (CPU), an application specific integrated circuit (ASIC), a field-programmable gate array (FPGA) or a complex programmable logic device (CPLD), the processor may also adopt a multi-core architecture.

In the embodiment, the memory 820 is configured to store computer programs; the transceiver 800 is configured to send and receive data under the control of the processor 810; the processor 810 is configured to read the computer programs in the memory 820 and execute the following operations:

sending a first message to a network data analytic function NWDAF directly or through a network exposure function NEF, where the first message is configured to request a subscription of analytics information of artificial intelligence/machine learning AI/ML model transfer status in the network;

receiving, directly or through the NEF, the analytics information of the AI/ML model transfer status sent by the NWDAF, where the analytics information is determined by the NWDAF according to received data of the AI/ML model transfer status sent by other network function(s) of a 5G core network 5GC NF(s), the data of the AI/ML model transfer status is obtained by the NWDAF by sending a second message to the 5GC NF(s) according to a parameter requested in the received first message, and the second message is configured to collect data for analyzing the AI/ML model transfer status in the network;

where the analytics information is configured to adjust a network policy parameter and/or information of an application layer model.

In an embodiment, the parameter requested in the first message includes at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

In an embodiment, the processor 810 is further configured to:

after the analytics information is received, send, according to the analytics information, a first request to a policy control function PCF directly or through the NEF;

where the first request is configured to request an update of a network policy parameter for the AI/ML model transfer and the network policy parameter is configured to optimize the AI/ML model transfer status.

In an embodiment, the processor 810, when being configured to send, according to the analytics information, the first request to the policy control function PCF directly or through the NEF, specifically includes:

determining, according to at least one of a bit rate in an uplink direction for transferring an AI/ML model and a bit rate in a downlink direction for transferring the AI/ML model, a packet delay in an uplink direction for an AI/ML model and a packet delay in a downlink direction for the AI/ML model, a number of abnormal releases of a quality of service flow during a time period of an AI/ML model transfer or a number of times for which a reporting threshold for abnormal releases of a quality of service flow during a time period of an AI/ML model transfer in the analytics information is reached, a new quality of service parameter for transferring the AI/ML model, where the new quality of service parameter includes at least one of the following: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

determining, according to the identifier of the application using the AI/ML model, the area information using the AI/ML model, IP address information of an application service using the AI/ML model, the network slice for the PDU session for the quality of service flow on which the AI/ML model is transferred and the name of the data network for the PDU session for the quality of service flow on which the AI/ML model is transferred in the analytics information, area information and address information of UE(s) and a respective AF transferring the AI/ML model; or, if the AI/ML model performs a federated learning, determining, according to the identifier indicating the federated learning group for analytics, the identifier of the UE or the identifier(s) of the UE(s) participating in the federated learning, the indication of the identifier of the respective application providing the AI/ML model or participating in the federated learning in the analytics information, area information and address information of UE(s) and a respective AF transferring the AI/ML model;

determining, according to the area information and the address information of the UE(s) and the respective AF transferring the AI/ML model, a data network access identifier DNAI and area information and address information of UE(s) and a respective AF correspond-
ing to the DNAI, where the area information and the
address information of the UE(s) and the respective AF
corresponding to the DNAI are used to provide a path
for optimization of the AI/ML model transfer status;
sending the new quality of service parameter, the DNAI,
and the area information and the address information of
the UE(s) and the respective AF corresponding to the
DNAI to the PCF as the parameter requested in the first
request directly or through the NEF.

In an embodiment, the processor 810, when being con-
figured to determine, according to the area information and
the address information of the UE(s) and the respective AF
transferring the AI/ML model, the data network access
identifier DNAI and the area information and the address
information of the UE(s) and the respective AF correspond-
ing to the DNAI, specifically includes:

determining, according to the area information and the
address information of the UE(s) and the respective AF
transferring the AI/ML model, whether a current rout-
ing path is not good;
if the current routing path is not good, determining,
according to the address information of the UE(s) and
the respective AF transferring the AI/ML model and the
area information of the UE(s), destination addresses of
both transferring parties in the AI/ML model;
determining, according to the destination addresses, a
nearest path;
determining, according to the nearest path, the DNAI and
the area information and the address information of the
UE(s) and the respective AF corresponding to the
DNAI.

In an embodiment, the first request is specifically used to:
request the PCF to adjust the 5G quality of service
identifier, the reflective quality of service control, the
maximum bit rate in the uplink direction for transfer-
ring the AI/ML model, the maximum bit rate in the
downlink direction for transferring the AI/ML model,
the lowest bit rate in the uplink direction for transfer-
ring the AI/ML model, the lowest bit rate in the
downlink direction for transferring the AI/ML model,
and the priority of the quality of service flow in a PCC
rule according to the new quality of service parameter,
and indicate the PCF to feedback a first update result
adjusted directly or through the NEF; where the first
update result is determined by the PCF according to a
result of the adjustment of the PCC rule based on the
new quality of service parameter;
correspondingly, the processor 810 is specifically config-
ured to:
receive, directly or through the NEF, the first update result
sent by the PCF, where the first update result includes
the first request being accepted or the first request being
rejected.

In an embodiment, the first request is specifically used to:
request the PCF to determine whether a session manage-
ment function SMF network element needs to update a
session management policy, if it is determined that the
SMF needs to update the session management policy,
then determine that the PCF sends a second request to
the SMF, where a parameter requested in the second
request includes at least one of the following: a DNAI,
a traffic steering policy identifier, traffic route informa-
tion, and the second request is configured by the SMF
to determine the selected user plane function UPF
according to a new session management policy and provide a corresponding DNAI, a corresponding traffic
steering policy identifier, and corresponding traffic
route information;
correspondingly, the processor 810 is specifically config-
ured to:
receive, directly or through the NEF, a second update
result sent by the PCF, where the second update result
is determined by the PCF according to whether a UPF
path is updated on account of the new session man-
agement policy sent by the SMF;
where the second update result includes the second
request being accepted or rejected.

In an embodiment, the processor 810 is further configured
to:
after the analytics information is received, adjust, accord-
ing to the analytics information, the information of the
application layer model, where the information of the
application layer model includes at least one of: model
compression, a model size, a model transmission time
period, model encoding and decoding; the information
of the application layer model is configured to update
a quality of service parameter;
determine, according to the adjusted information of the
application layer model, the new quality of service
parameter, where the new quality of service parameter
includes: a 5G quality of service identifier, a reflective
quality of service control, a maximum bit rate in an
uplink direction for transferring the AI/ML model, a
maximum bit rate in a downlink direction for transfer-
ring the AI/ML model, a lowest bit rate in an uplink
direction for transferring the AI/ML model, a lowest bit
rate in a downlink direction for transferring the AI/ML
model, or a priority of a quality of service flow;
send a third request to a policy control function PCF
directly or through the NEF;
where a parameter requested in the third request includes
the new quality of service parameter, and the third
request is configured to request an update of a quality
of service parameter.

In an embodiment, the third request is specifically used to:
request the PCF to adjust the 5G quality of service
identifier, the reflective quality of service control, the
maximum bit rate in the uplink direction for transfer-
ring the AI/ML model, the maximum bit rate in the
downlink direction for transferring the AI/ML model,
the lowest bit rate in the uplink direction for transfer-
ring the AI/ML model, the lowest bit rate in the
downlink direction for transferring the AI/ML model,
and the priority of the quality of service flow in a PCC
rule according to the new quality of service parameter;
correspondingly, the processor 810 is further configured
to:
receive, directly or through the NEF, a third update result
sent by the PCF, where the third update result is
determined by the PCF based on a result of the adjust-
ment of the PCC rule, and the third update result
includes the third request being accepted or the third
request being rejected.

In an embodiment, the processor 810 is further configured
to:
after the information of the application layer model is
adjusted, send model compression, a model size and
model encoding and decoding in the adjusted informa-
tion of the application layer model directly to the PCF,
where the adjusted information of the application layer
model is configured to support the PCF to adjust the 5G
quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow in a PCC rule;

correspondingly, the processor 810 is further configured to:

receive a fourth update result sent by the PCF, where the fourth update result is determined by the PCF according to a result of the adjustment of the PCC rule based on the adjusted information of the application layer model, and the fourth update result includes the third request being accepted or the third request being rejected.

In an embodiment, the processor 810 is further configured to:

after the information of the application layer model is adjusted, send the model transmission time period in the adjusted information of the application layer model directly to the PCF, where the model transmission time period in the adjusted information of the application layer model is configured to support the PCF to adjust a gate status parameter in a PCC rule, and the gate status parameter is configured to support the SMF to update a session management policy according to a transmission start time and a transmission stop time in a gate status;

correspondingly, the processor 810 is further configured to:

receive a fifth update result sent by the PCF, where the fifth update result is determined by the PCF by receiving a result of a new session management policy sent by the SMF, and the fifth update result includes the third request being accepted or the third request being rejected.

It should be noted that the apparatus for subscribing to the analytics of the model transfer status in the network provided by the embodiment of the present disclosure can realize all the method steps realized by the method embodiments shown in FIG. 3 to FIG. 6 and can achieve the same effect, the same parts and beneficial effects between this embodiment and the method embodiments are not repeated in detail.

FIG. 9 is a schematic structural diagram of an apparatus for subscribing to an analytics of model transfer status in a network provided by another embodiment of the present disclosure. As shown in FIG. 9, the apparatus for subscribing to the analytics of the model transfer status in the network provided by the embodiment is applied to an AF, the apparatus 900 for subscribing to the analytics of the model transfer status in the network provided in the embodiment includes:

a sending unit 901, configured to send a first message to a network data analytic function NWDAF directly or through a network exposure function NEF, where the first message is configured to request a subscription of analytics information of artificial intelligence/machine learning AI/ML model transfer status in the network;

an analyzing unit 902, configured to receive, directly or through the NEF, the analytics information of the AI/ML model transfer status sent by the NWDAF, where the second message is configured to collect data for analyzing the AI/ML model transfer status in the network;

where the analytics information is configured to adjust a network policy parameter and/or information of an application layer model.

In an embodiment, a parameter requested in the first message includes at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, a quality of service requirement, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

In an embodiment, the sending unit is further configured to:

after the analytics information is received, send, according to the analytics information, a first request to a policy control function PCF directly or through the NEF;

where the first request is configured to request an update of a network policy parameter for the AI/ML model transfer and the network policy parameter is configured to optimize the AI/ML model transfer status.

In an embodiment, the sending unit is specifically configured to: determine, according to at least one of a bit rate in an uplink direction for transferring an AI/ML model and a bit rate in a downlink direction for transferring the AI/ML model, a packet delay in an uplink direction for an AI/ML model and a packet delay in a downlink direction for the AI/ML model, a number of abnormal releases of a quality of service flow during a time period of an AI/ML model transfer or a number of times for which a reporting threshold for abnormal releases of a quality of service flow during a time period of an AI/ML model transfer in the analytics information is reached, a new quality of service parameter for transferring the AI/ML model, where the new quality of service parameter includes at least one of the following: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

determine, according to the identifier of the application using the AI/ML model, the area information using the AI/ML model, IP address information of an application service using the AI/ML model, the network slice for the PDU session for the quality of service flow on which the AI/ML model is transferred and the name of the data network for the PDU session for the quality of service flow on which the AI/ML model is transferred in the analytics information, area information and address information of UE(s) and a respective AF transferring the AI/ML model; or, if the AI/ML model performs a federated learning, determining, according to the identifier indicating the federated learning group for analytics, the identifier of the UE or the identifier(s) of the UE(s) participating in the federated learning, the indication of the identifier of the respective application providing the AI/ML model or participating in the federated learning in the analytics information, area information and address information of UE(s) and a respective AF transferring the AI/ML model;

determine, according to the area information and the address information of the UE(s) and the respective AF transferring the AI/ML model, a data network access identifier DNAI and area information and address information of UE(s) and a respective AF corresponding to the DNAI, where the area information and the address information of the UE(s) and the respective AF corresponding to the DNAI are used to provide a path for optimization of the AI/ML model transfer status;

send the new quality of service parameter, the DNAI, and the area information and the address information of the UE(s) and the respective AF corresponding to the DNAI to the PCF as the parameter requested in the first request directly or through the NEF.

In an embodiment, the sending unit is further specifically configured to:

determine, according to the area information and the address information of the UE(s) and the respective AF transferring the AI/ML model, whether a current routing path is not good;

if the current routing path is not good, determine, according to the address information of the UE(s) and the respective AF transferring the AI/ML model and the area information of the UE(s), destination addresses of both transferring parties in the AI/ML model;

determine, according to the destination addresses, a nearest path;

determine, according to the nearest path, the DNAI and the area information and the address information of the UE(s) and the respective AF corresponding to the DNAI.

In an embodiment, the first request is specifically configured to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter, and indicate the PCF to feedback a first update result adjusted directly or through the NEF; where the first update result is determined by the PCF according to a result of the adjustment of the PCC rule based on the new quality of service parameter;

correspondingly, the sending unit is further configured to:

receive, directly or through the NEF, the first update result sent by the PCF, where the first update result includes the first request being accepted or the first request being rejected.

In an embodiment, the first request is specifically used to:

request the PCF to determine whether a session management function SMF network element needs to update a session management policy, if it is determined that the SMF needs to update the session management policy, then determine that the PCF sends a second request to the SMF, where a parameter requested in the second request includes at least one of the following: a DNAI, a traffic steering policy identifier, traffic route information, and the second request is configured by the SMF to determine the selected user plane function UPF according to a new session management policy and provide a corresponding DNAI, a corresponding traffic steering policy identifier, and corresponding traffic route information;

correspondingly, the receiving unit is further configured to:

receive, directly or through the NEF, a second update result sent by the PCF, where the second update result is determined by the PCF according to whether a UPF path is updated on account of the new session management policy sent by the SMF;

where the second update result includes the second request being accepted or rejected.

In an embodiment, the apparatus further includes a determining unit; the determining unit is configured to:

after the analytics information is received, adjust, according to the analytics information, the information of the application layer model, where the information of the application layer model includes at least one of model compression, a model size, a model transmission time period, model encoding and decoding; the information of the application layer model is configured to update a quality of service parameter;

determine, according to the adjusted information of the application layer model, the new quality of service parameter, where the new quality of service parameter includes: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

send a third request to a policy control function PCF directly or through the NEF;

where a parameter requested in the third request includes the new quality of service parameter, and the third request is configured to request an update of a quality of service parameter.

In an embodiment, the third request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter;

correspondingly, the receiving unit is further configured to:

receive, directly or through the NEF, a third update result sent by the PCF, where the third update result is determined by the PCF based on a result of the adjustment of the PCC rule, and the third update result includes the third request being accepted or the third request being rejected.

In an embodiment, the sending unit is further configured to:

after the information of the application layer model is adjusted, send model compression, a model size and model encoding and decoding in the adjusted information of the application layer model directly to the PCF, where the adjusted information of the application layer model is configured to support the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow in a PCC rule;

correspondingly, the receiving unit is further configured to:

receive a fourth update result sent by the PCF, where the fourth update result is determined by the PCF according to a result of the adjustment of the PCC rule based on the adjusted information of the application layer model, and the fourth update result includes the third request being accepted or the third request being rejected.

In an embodiment, the sending unit is further configured to:

after the information of the application layer model is adjusted, send the model transmission time period in the adjusted information of the application layer model directly to the PCF, where the model transmission time period in the adjusted information of the application layer model is configured to support the PCF to adjust a gate status parameter in a PCC rule, and the gate status parameter is configured to support the SMF to update a session management policy according to a transmission start time and a transmission stop time in a gate status;

correspondingly, the receiving unit is further configured to:

receive a fifth update result sent by the PCF, where the fifth update result is determined by the PCF by receiving a result of a new session management policy sent by the SMF, and the fifth update result includes the third request being accepted or the third request being rejected.

It should be noted that the apparatus for subscribing to the analytics of the model transfer status in the network provided by the embodiment of the present disclosure can realize all the method steps realized by the method embodiments shown in FIG. 3 to FIG. 6 and can achieve the same effect, the same parts and beneficial effects between this embodiment and the method embodiments are not repeated in detail.

FIG. 10 is a schematic structural diagram of an apparatus for subscribing to an analytics of model transfer status in a network provided by yet another embodiment of the present disclosure. As shown in FIG. 10, the apparatus for subscribing to the analytics of the model transfer status in the network provided by the embodiment is applied to an NWDAF. The apparatus for subscribing to the analytics of the model transfer status in the network provided in the embodiment includes: a transceiver 1000, configured to receive and send data under a control of a processor 1010.

In FIG. 10, a bus architecture may include any number of interconnected buses and bridges, specifically, one or more processors represented by the processor 1010 and various circuits of the memory represented by the memory 1020 are linked together. The bus architecture may also link various other circuits together, such as peripherals, voltage regulators, and power management circuits, which are well known in the art and, therefore, will not be described further herein. A bus interface provides an interface. The transceiver 1000 may be multiple elements, i.e., including a transmitter and a receiver, providing elements for communicating with various other apparatuses over transmission mediums, these transmission mediums include wireless channels, wired channels, fiber optic cables, and other transmission mediums. The processor 1010 is responsible for managing the bus architecture and general processing, and the memory 1020 may store data used by the processor 1010 when performing operations.

The processor 1010 may be a central processing unit (CPU), an application specific integrated circuit (ASIC), a field-programmable gate array (FPGA) or a complex programmable logic device (CPLD), the processor 1010 may also adopt a multi-core architecture.

In the embodiment, the memory 1020 is configured to store computer programs; the transceiver 1000 is configured to send and receive data under the control of the processor 1010; the processor 1010 is configured to read the computer programs in the memory 1020 and execute the following operations:

receiving, directly or through a network exposure function NEF, a first message sent by an application function AF, where the first message is configured to request a subscription of analytics information of artificial intelligence/machine learning AI/ML model transfer status in the network;

sending, according to a parameter requested in the first message, a second message to other network function(s) of a 5G core network 5GC NF(s), where the second message is configured to collect data for analyzing the AI/ML model transfer status in the network;

receiving the data of the AI/ML model transfer status sent by the other network function(s) of the 5G core network 5GC NF(s), and analyzing the data of the AI/ML model transfer status to obtain the analytics information of the AI/ML model transfer status;

where the analytics information is configured to adjust a network policy parameter and/or information of an application layer model through the AF.

In an embodiment, the parameter requested in the first message includes at least one of the following: a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, a quality of service requirement, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

It should be noted that the apparatus for subscribing to the analytics of the model transfer status in the network provided by the embodiment of the present disclosure can realize all the method steps realized by the method embodiments shown in FIG. 4 and FIG. 7 and can achieve the same effect, the same parts and beneficial effects between this embodiment and the method embodiments are not repeated in detail.

Figure 11:
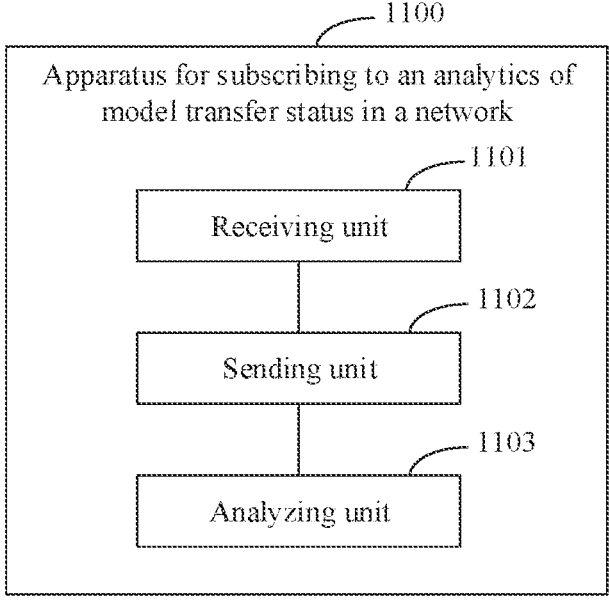
FIG. 11 is a schematic structural diagram of an apparatus for subscribing to an analytics of model transfer status in a network provided by yet another embodiment of the present disclosure.

FIG. 11 is a schematic structural diagram of an apparatus for subscribing to an analytics of model transfer status in a network provided by yet another embodiment of the present disclosure. As shown in FIG. 11, the apparatus for subscribing to the analytics of the model transfer status in the network provided by the embodiment is applied to an NWDAF. The apparatus 1100 for subscribing to the analytics of the model transfer status in the network provided in the embodiment includes:

a receiving unit 1101, configured to receive, directly or through a network exposure function NEF, a first message sent by an application function AF, where the first message is configured to request a subscription of analytics information of artificial intelligence/machine learning AI/ML model transfer status in the network;

a sending unit 1102, configured to send, according to a parameter requested in the first message, a second message to other network function(s) of a 5G core network 5GC NF(s), the second message is configured to collect data for analyzing the AI/ML model transfer status in the network;

an analyzing unit 1103, further configured to receive the data of the AI/ML model transfer status sent by the other network function(s) of the 5G core network 5GC NF(s), and analyze the data of the AI/ML model transfer status to obtain the analytics information of the AI/ML model transfer status;

where the analytics information is configured to adjust a network policy parameter and/or information of an application layer model through the AF.

In an embodiment, the parameter requested in the first message includes at least one of a network data analytics identifier, an identifier of a user equipment UE or identifiers of a group of UEs receiving an AI/ML model or an identifier of any UE that meets an analytics condition, an identifier of an application using an AI/ML model, an area of an AI/ML model transfer, an indication of a network slice for a protocol data unit PDU session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message includes at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information includes at least one of the following: a network slice for a PDU session for a quality of service flow on which an AI/ML model is transferred, an identifier of an application using an AI/ML model, area information using an AI/ML model, a valid time of an analytics result, a user plane function UPF providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

where if the AI/ML model performs a federated learning, the parameter requested in the first message further includes: federated learning group information, and the federated learning group information includes at least one of the following: an identifier indicating a federated learning group for analytics, an identifier of a UE or identifier(s) of UE(s) participating in the federated learning or an identifier of an application participating in the federated learning;

correspondingly, the second message further includes at least one of the following: an identifier indicating a federated learning group for analytics, an identifier of a UE or identifier(s) of UE(s) participating in the federated learning or an identifier of an application participating in the federated learning;

correspondingly, the analytics information further includes at least one of the following: an identifier indicating a federated learning group for analytics, an identifier of a UE or identifier(s) of UE(s) participating in the federated learning, an indication of an identifier of a respective application providing the AI/ML model or participating in the federated learning.

It should be noted that the apparatus for subscribing to the analytics of the model transfer status in the network provided by the embodiment of the present disclosure can realize all the method steps realized by the method embodiments shown in FIG. 4 and FIG. 7 and can achieve the same effect, the same parts and beneficial effects between this embodiment and the method embodiments are not repeated in detail.

It should be noted that the division of units in the embodiments of the application is illustrative, which is only a logical function division, and in an actual implementation, there may be other division manners. In addition, each functional unit in each embodiment of the application may be integrated into a processing unit, or each unit may exist physically independently, or two or more units may be integrated into a unit. The integrated units mentioned above may be realized in the form of hardware or software functional units.

If an integrated unit is implemented as a software functional unit and sold or used as an independent product, it may be stored in a processor readable storage medium. Based on this understanding, the embodiments of the application, in essence, or the part that contributes to the prior art, or the whole or part of the embodiments, may be embodied in the form of a software product, which is stored in a storage medium, including a number of instructions to enable a computer device (which may be a personal computer, a server, or a network device, etc.) or a processor to execute all or part of the steps of the method described in the various embodiments of the present disclosure. The aforementioned storage media include: a U disk, a mobile hard disk, a read-only memory (ROM), a random access memory (RAM), a magnetic disc or an optical disc and other media that can store program codes.

An embodiment of the present disclosure further provides a processor readable storage medium, having stores computer programs stored thereon, the computer programs are used to cause a processor to execute any one of the above method embodiments.

The processor readable storage medium can be any available medium or data storage device that can be accessed by the processor, including but not limited to, a magnetic memory (such as a floppy disk, a hard disk, a tape, a magneto-optical disk (MO), etc.), an optical memory (such as a compact disc (CD), a digital versatile disc (DVD), a Blu-ray Disc (BD), a Holographic Versatile Disc (HVD), etc.), and a semiconductor memory (such as a ROM, an Erasable Programmable Read Only Memory (EPROM), an Electrically Erasable Programmable Read-Only Memory (EEPROM), a non-volatile memory (NAND FLASH), a solid state disk (SSD), etc.).

Embodiments of the present disclosure can be provided as methods, systems, or computer program products. Therefore, the present disclosure may take the form of a complete hardware embodiment, a complete software embodiment, or an embodiment combining software and hardware aspects. Furthermore, the present disclosure may take the form of a computer program product implemented on one or more computer usable storage mediums (including but not limited to a disk memory, an optical memory, etc.) containing computer usable program codes.

The present disclosure is described with reference to a flowchart and/or a block diagram of the method, apparatus, and computer program product according to the embodiments of the present disclosure. It should be understood that each flow and/or block in the flowchart and/or block diagram, and a combination of flow and/or block in the flowchart and/or block diagram can be realized by computer executable instructions. These computer executable instructions may be provided to a processor of a general purpose computer, a special purpose computer, an embedded processor or other programmable data processing devices to generate a machine and instructions executed by a processor of a computer or other programmable data processing devices generate devices for implementing functions specified in one or more flowcharts and/or one or more block diagrams.

These processor executable instructions may also be stored in a processor readable memory that can guide the computer or other programmable data processing devices to work in a specific way, and the instructions stored in the processor readable memory generate a manufacture including an instruction apparatus, the instruction apparatus implements the functions specified in one or more flowcharts and/or one or more block diagrams.

These processor executable instructions may also be loaded onto the computer or other programmable data processing devices to enable a series of operating steps to be executed on the computer or other programmable devices to generate a computer implemented process, and instructions executed on the computer or other programmable devices provide steps for implementing functions specified in a flow or multiple flows in flowcharts and/or a block or multiple blocks in block diagrams.

Various modifications and variations to the present disclosure without departing from the spirit and scope of the present disclosure. In this way, if these modifications and variations of the present disclosure fall within the scope of the claims and their equivalent technologies of the present disclosure, the present disclosure is also intended to include these modifications and variations.

The invention claimed is:

1. A method for subscribing to an analytics of model transfer status in a network, wherein the method is applied to an application function (AF), and the method comprises:

sending a first message to a network data analytic function (NWDAF) directly or through a network exposure function (NEF), wherein the first message is configured to request a subscription of analytics information of artificial intelligence/machine learning (AI/ML) model transfer status in the network;

receiving, directly or through the NEF, the analytics information of the AI/ML model transfer status sent by the NWDAF, wherein the analytics information is determined by the NWDAF according to received data of the AI/ML model transfer status sent by other network function(s) of a 5G core network (5GC NF(s));

wherein the analytics information is configured to adjust a network policy parameter and/or information of an application layer model.

2. The method according to claim 1, wherein the data of the AI/ML model transfer status is obtained by the NWDAF by sending a second message to the 5GC NF(s) according to a parameter requested in the received first message, and the second message is configured to collect data for analyzing the AI/ML model transfer status in the network.

3. The method according to claim 2, wherein the parameter requested in the first message comprises at least one of the following: a network data analytics identifier, an identifier of a user equipment (UE) or identifiers of a group of UEs receiving an AI/ML model or an identifier of any UE that meets an analytics condition, an identifier of an application using an AI/ML model, an area of an AI/ML model transfer, an indication of a network slice for a protocol data unit (PDU) session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message comprises at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information comprises at least one of the following: a network slice for a PDU session for a quality of service flow on which an AI/ML model is transferred, an identifier of an application using an AI/ML model, area information using an AI/ML model, a valid time of an analytics result, a user plane function (UPF) providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

wherein if the AI/ML model performs a federated learning, the parameter requested in the first message further comprises: federated learning group information, and the federated learning group information comprises at least one of the following: an identifier indicating a federated learning group for analytics, an identifier of a UE or identifier(s) of UE(s) participating in the federated learning or an identifier of an application participating in the federated learning;

correspondingly, the second message further comprises at least one of the following: an identifier indicating a federated learning group for analytics, an identifier of a UE or identifier(s) of UE(s) participating in the federated learning or an identifier of an application participating in the federated learning;

correspondingly, the analytics information further comprises at least one of the following: an identifier indicating a federated learning group for analytics, an identifier of a UE or identifier(s) of UE(s) participating in the federated learning, an indication of an identifier of a respective application providing the AI/ML model or participating in the federated learning.

4. The method according to claim 1, wherein after receiving the analytics information, the method further comprises:

sending, according to the analytics information, a first request to a policy control function (PCF) directly or through the NEF;

wherein the first request is configured to request an update of a network policy parameter for the AI/ML model transfer and the network policy parameter is configured to optimize the AI/ML model transfer status.

5. The method according to claim 4, wherein sending, according to the analytics information, the first request to the policy control function (PCF) directly or through the NEF comprises:

determining, according to at least one of a bit rate in an uplink direction for transferring an AI/ML model and a bit rate in a downlink direction for transferring the AI/ML model, a packet delay in an uplink direction for an AI/ML model and a packet delay in a downlink direction for the AI/ML model, a number of abnormal releases of a quality of service flow during a time period of an AI/ML model transfer or a number of times for which a reporting threshold for abnormal releases of a quality of service flow during a time period of an AI/ML model transfer in the analytics information is reached, a new quality of service parameter for transferring the AI/ML model, wherein the new quality of service parameter comprises at least one of the following: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

determining, according to the identifier of the application using the AI/ML model, the area information using the AI/ML model, IP address information of an application service using the AI/ML model, the network slice for the PDU session for the quality of service flow on which the AI/ML model is transferred and the name of the data network for the PDU session for the quality of service flow on which the AI/ML model is transferred in the analytics information, area information and address information of UE(s) and a respective AF transferring the AI/ML model; or, if the AI/ML model performs a federated learning, determining, according to the identifier indicating the federated learning group for analytics, the identifier of the UE or the identifier(s) of the UE(s) participating in the federated learning, the indication of the identifier of the respective application providing the AI/ML model or participating in the federated learning in the analytics information, area information and address information of UE(s) and a respective AF transferring the AI/ML model;

determining, according to the area information and the address information of the UE(s) and the respective AF transferring the AI/ML model, a data network access identifier (DNAI) and area information and address information of UE(s) and a respective AF corresponding to the DNAI, wherein the area information and the address information of the UE(s) and the respective AF corresponding to the DNAI are used to provide a path for optimization of the AI/ML model transfer status;

sending the new quality of service parameter, the DNAI, and the area information and the address information of the UE(s) and the respective AF corresponding to the DNAI to the PCF as the parameter requested in the first request directly or through the NEF.

6. The method according to claim 5, wherein determining, according to the area information and the address information of the UE(s) and the respective AF transferring the AI/ML model, the data network access identifier (DNAI) and the area information and the address information of the UE(s) and the respective AF corresponding to the DNAI comprises:

determining, according to the area information and the address information of the UE(s) and the respective AF transferring the AI/ML model, whether a current routing path is not good;

if the current routing path is not good, determining, according to the address information of the UE(s) and the respective AF transferring the AI/ML model and the area information of the UE(s), destination addresses of both transferring parties in the AI/ML model;

determining, according to the destination addresses, a nearest path;

determining, according to the nearest path, the DNAI and the area information and the address information of the UE(s) and the respective AF corresponding to the DNAI.

7. The method according to claim 5, wherein the first request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter, and indicate the PCF to feedback a first update result adjusted directly or through the NEF; wherein the first update result is determined by the PCF according to a result of the adjustment of the PCC rule based on the new quality of service parameter;

correspondingly, the method further comprises:

receiving, directly or through the NEF, the first update result sent by the PCF, wherein the first update result comprises the first request being accepted or the first request being rejected.

8. The method according to claim 5, wherein the first request is specifically used to:

request the PCF to determine whether a session management function (SMF) network element needs to update a session management policy, if it is determined that the SMF needs to update the session management policy, then determine that the PCF sends a second request to the SMF, wherein a parameter requested in the second request comprises at least one of the following: a DNAI, a traffic steering policy identifier, traffic route information, and the second request is configured by the SMF to determine a selected user plane function (UPF) according to a new session management policy and provide a corresponding DNAI, a corresponding traffic steering policy identifier, and corresponding traffic route information;

correspondingly, the method further comprises:

receiving, directly or through the NEF, a second update result sent by the PCF, wherein the second update result is determined by the PCF according to whether a UPF path is updated on account of the new session management policy sent by the SMF;

wherein the second update result comprises the first-second request being accepted or rejected.

9. The method according to claim 1, wherein after receiving the analytics information, the method further comprises:

adjusting, according to the analytics information, the information of the application layer model, wherein the information of the application layer model comprises at least one of: model compression, a model size, a model transmission time period, model encoding and decoding; the information of the application layer model is configured to update a quality of service parameter;

determining, according to the adjusted information of the application layer model, a new quality of service parameter, wherein the new quality of service parameter comprises: a 5G quality of service identifier, a reflective quality of service control, a maximum bit rate in an uplink direction for transferring the AI/ML model, a maximum bit rate in a downlink direction for transferring the AI/ML model, a lowest bit rate in an uplink direction for transferring the AI/ML model, a lowest bit rate in a downlink direction for transferring the AI/ML model, or a priority of a quality of service flow;

sending a third request to a policy control function (PCF) directly or through the NEF;

wherein a parameter requested in the third request comprises the new quality of service parameter, and the third request is configured to request an update of a quality of service parameter.

10. The method according to claim 9, wherein the third request is specifically used to:

request the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, and the priority of the quality of service flow in a PCC rule according to the new quality of service parameter;

correspondingly, the method further comprises:

receiving, directly or through the NEF, a third update result sent by the PCF, wherein the third update result is determined by the PCF based on a result of the adjustment of the PCC rule, and the third update result comprises the third request being accepted or the third request being rejected.

11. The method according to claim 9, wherein after adjusting the information of the application layer model, the method further comprises:

sending model compression, a model size and model encoding and decoding in the adjusted information of the application layer model directly to the PCF, wherein the adjusted information of the application layer model is configured to support the PCF to adjust the 5G quality of service identifier, the reflective quality of service control, the maximum bit rate in the uplink direction for transferring the AI/ML model, the maximum bit rate in the downlink direction for transferring the AI/ML model, the lowest bit rate in the uplink direction for transferring the AI/ML model, the lowest bit rate in the downlink direction for transferring the AI/ML model, the priority of the quality of service flow in a PCC rule;

correspondingly, the method further comprises:

receiving a fourth update result sent by the PCF, wherein the fourth update result is determined by the PCF according to a result of the adjustment of the PCC rule based on the adjusted information of the application layer model, and the fourth update result comprises the third request being accepted or the third request being rejected.

12. The method according to claim 9, wherein after adjusting the information of the application layer model, the method further comprises:

sending the model transmission time period in the adjusted information of the application layer model directly to the PCF, wherein the model transmission time period in the adjusted information of the application layer model is configured to support the PCF to adjust a gate status parameter in a PCC rule, and the gate status parameter is configured to support the SMF to update a session management policy according to a transmission start time and a transmission stop time in a gate status;

correspondingly, the method further comprises:

receiving a fifth update result sent by the PCF, wherein the fifth update result is determined by the PCF by receiving a result of a new session management policy sent by the SMF, and the fifth update result comprises the third request being accepted or the third request being rejected.

13. A method for subscribing to an analytics of model transfer status in a network, wherein the method is applied to a network data analytic function (NWDAF), and the method comprises:

receiving, directly or through a network exposure function (NEF), a first message sent by an application function (AF), wherein the first message is configured to request a subscription of analytics information of artificial intelligence/machine learning (AI/ML) model transfer status in the network;

sending, according to a parameter requested in the first message, a second message to other network function(s) of a 5G core network (5GC NF(s)), wherein the second message is configured to collect data for analyzing the AI/ML model transfer status in the network;

receiving the data of the AI/ML model transfer status sent by the other network function(s) of the 5G core network (5GC NF(s)), and analyzing the data of the AI/ML model transfer status to obtain the analytics information of the AI/ML model transfer status;

wherein the analytics information is configured to adjust a network policy parameter and/or information of an application layer model through the AF.

14. The method according to claim 13, wherein the parameter requested in the first message comprises at least one of the following: a network data analytics identifier, an identifier of a user equipment (UE) or identifiers of a group of UEs receiving an AI/ML model or an identifier of any UE that meets an analytics condition, an identifier of an application using an AI/ML model, an area of an AI/ML model transfer, an indication of a network slice for a protocol data unit (PDU) session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message comprises at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information comprises at least one of the following: a network slice for a PDU session for a quality of service flow on which an AI/ML model is transferred, an identifier of an application using an AI/ML model, area information using an AI/ML model, a valid time of an analytics result, a user plane function (UPF) providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

wherein if the AI/ML model performs a federated learning, the parameter requested in the first message further comprises: federated learning group information, and the federated learning group information comprises at least one of the following: an identifier indicating a federated learning group for analytics, an identifier of a UE or identifier(s) of UE(s) participating in the federated learning or an identifier of an application participating in the federated learning;

correspondingly, the second message further comprises at least one of the following: an identifier indicating a federated learning group for analytics, an identifier of a UE or identifier(s) of UE(s) participating in the federated learning or an identifier of an application participating in the federated learning;

correspondingly, the analytics information further comprises at least one of the following: an identifier indicating a federated learning group for analytics, an identifier of a UE or identifier(s) of UE(s) participating in the federated learning, an indication of an identifier of a respective application providing the AI/ML model or participating in the federated learning.

15. An apparatus for subscribing to an analytics of model transfer status in a network, wherein the apparatus comprises a memory, a transceiver, and a processor;

the memory is configured to store computer programs; the transceiver is configured to send and receive data under a control of the processor; the processor is configured to read the computer programs in the memory and perform the following operations:

sending a first message to a network data analytic function (NWDAF) directly or through a network exposure function (NEF), wherein the first message is configured to request a subscription of analytics information of artificial intelligence/machine learning (AI/ML) model transfer status in the network;

receiving, directly or through the NEF, the analytics information of the AI/ML model transfer status sent by the NWDAF, wherein the analytics information is determined by the NWDAF according to received data of the AI/ML model transfer status sent by other network function(s) of a 5G core network (5GC NF(s));

wherein the analytics information is configured to adjust a network policy parameter and/or information of an application layer model.

16. An apparatus for subscribing to an analytics of model transfer status in a network, wherein the apparatus comprises a memory, a transceiver, and a processor;

the memory is configured to store computer programs; the transceiver is configured to send and receive data under a control of the processor; the processor is configured to read the computer programs in the memory and perform the method according to claim 13.

17. A non-transitory processor readable storage medium, having computer programs stored thereon, the computer programs are used to cause a processor to execute the method according to claim 1.

18. The apparatus according to claim 15, wherein the data of the AI/ML model transfer status is obtained by the NWDAF by sending a second message to the 5GC NF(s) according to a parameter requested in the received first message, and the second message is configured to collect data for analyzing the AI/ML model transfer status in the network.

19. The apparatus according to claim 16, wherein the parameter requested in the first message comprises at least one of the following: a network data analytics identifier, an identifier of a user equipment (UE) or identifiers of a group of UEs receiving an AI/ML model or an identifier of any UE that meets an analytics condition, an identifier of an application using an AI/ML model, an area of an AI/ML model transfer, an indication of a network slice for a protocol data unit (PDU) session for a quality of service flow on which an AI/ML model is transferred, an indication of a data network for a PDU session for a quality of service flow on which an AI/ML model is transferred, a time period of an AI/ML model transfer, a start timestamp of an AI/ML model transfer, a stop timestamp of an AI/ML model transfer, a size of an AI/ML transfer model, an indication of a quality of service requirement for a quality of service flow on which an AI/ML model is transferred and/or an indication of a specific quality of service requirement for transferring an AI/ML model;

the second message comprises at least one of the following: a current location of a UE using an AI/ML model, an identifier of an application using an AI/ML model, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of packet transmissions of an AI/ML model, a number of packet retransmissions of an AI/ML model, a data collection time, a duration of an AI/ML model transfer, a start timestamp of an AI/ML model transfer, a stop timestamp of an AI/ML model transfer, a size of an AI/ML transfer model, a network slice for a PDU session for a quality of service flow on which an AI/ML model is transferred, a data network for a PDU session for a quality of service flow on which an AI/ML model is transferred or a service process for the AF;

the analytics information comprises at least one of the following: a network slice for a PDU session for a quality of service flow on which an AI/ML model is transferred, an identifier of an application using an AI/ML model, area information using an AI/ML model, a valid time of an analytics result, a user plane function (UPF) providing an AI/ML model transfer, a data network name for a PDU session for a quality of service flow on which an AI/ML model is transferred, a size of an AI/ML transfer model, a duration of an AI/ML model transfer, a start timestamp of an AI/ML model transfer, a stop timestamp of an AI/ML model transfer, an identifier of a quality of service flow on which an AI/ML model is transferred, a bit rate in an uplink direction for transferring an AI/ML model and a bit rate in a downlink direction for transferring an AI/ML model, a packet delay in an uplink direction for an AI/ML model and a packet delay in a downlink direction for an AI/ML model, a number of abnormal releases of a quality of service flow during a time period of an AI/ML model transfer, a number of times for which a reporting threshold for abnormal releases of a quality of service flow during a time period of an AI/ML model transfer is reached, a number of packet transmissions of an AI/ML model or a number of packet retransmissions of an AI/ML model;

wherein if the AI/ML model performs a federated learning, the parameter requested in the first message further comprises: federated learning group information, and the federated learning group information comprises at least one of the following: an identifier indicating a federated learning group for analytics, an identifier of a UE or identifier(s) of UE(s) participating in the federated learning or an identifier of an application participating in the federated learning;

correspondingly, the second message further comprises at least one of the following: an identifier indicating a federated learning group for analytics, an identifier of a UE or identifier(s) of UE(s) participating in the federated learning or an identifier of an application participating in the federated learning;

correspondingly, the analytics information further comprises at least one of the following: an identifier indicating a federated learning group for analytics, an identifier of a UE or identifier(s) of UE(s) participating in the federated learning, an indication of an identifier of a respective application providing the AI/ML model or participating in the federated learning.

20. A non-transitory processor readable storage medium, having computer programs stored thereon, the computer programs are used to cause a processor to execute the method according to claim 13.

* * * * *